US012596385B2

(12) United States Patent
Shao et al.

(10) Patent No.: US 12,596,385 B2
(45) Date of Patent: Apr. 7, 2026

(54) METHOD, SYSTEM, AND STORAGE MEDIUM FOR PIPELINE CLEANING BASED ON SMART GAS SUPERVISION INTERNET OF THINGS (IOT)

(71) Applicant: CHENGDU QINCHUAN IOT TECHNOLOGY CO., LTD., Chengdu (CN)

(72) Inventors: Zehua Shao, Chengdu (CN); Yaqiang Quan, Chengdu (CN); Lei He, Chengdu (CN); Siwei Zeng, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/180,123

(22) Filed: Apr. 15, 2025

(65) Prior Publication Data
US 2026/0056555 A1     Feb. 26, 2026

(30) Foreign Application Priority Data

Mar. 25, 2025     (CN) ......................... 202510352906.8

(51) Int. Cl.
*G05D 1/648*          (2024.01)
*G16Y 40/10*         (2020.01)
(Continued)

(52) U.S. Cl.
CPC .............. *G05D 1/648* (2024.01); *G16Y 40/10* (2020.01); *G16Y 40/35* (2020.01); *G05D 2105/10* (2024.01)

(58) Field of Classification Search
CPC .... G05D 1/648; G05D 2105/10; G16Y 40/10; G16Y 40/35
See application file for complete search history.

(56) References Cited

U.S. PATENT DOCUMENTS

2020/0286351 A1*  9/2020  Corcoran ............ H04L 12/2825
2025/0037216 A1   1/2025  Shao et al.

FOREIGN PATENT DOCUMENTS

CN          111359333 B       3/2022
CN          116187724 A       5/2023
(Continued)

OTHER PUBLICATIONS

Fang, Wei, Research on the Spatial and Temporal Evolution Law of Gas Pipeline Network Leakage Effect Under Coupling Conditions, Chinese Master's Theses Full-text Database Engineering Technology II, 2024, 73 pages.

(Continued)

*Primary Examiner* — Basil T. Jos
(74) *Attorney, Agent, or Firm* — METIS IP LLC

(57)          ABSTRACT

Provided are a method, a system, and a storage medium for pipeline cleaning based on smart gas supervision IoT. The method comprises: obtaining pollutant discharge working data and gas monitoring data obtained by a smart gas device object platform, and storing the pollutant discharge working data and the gas monitoring data in a gas database, determining a pipeline cleaning parameter based on the pollutant discharge working data and the gas monitoring data, and uploading the pipeline cleaning parameter to a smart gas government safety monitoring management platform, generating a cleaning regulation instruction based on the pipeline cleaning parameter, and sending the cleaning regulation instruction to the smart gas device object platform to control a target pollutant discharge device to perform cleaning based on the cleaning working parameter.

9 Claims, 5 Drawing Sheets

(51) Int. Cl.
    *G16Y 40/35*        (2020.01)
    *G05D 105/10*     (2024.01)

(56)             References Cited

FOREIGN PATENT DOCUMENTS

| | | | |
|---|---|---|---|
| CN | 117973877 A | 5/2024 | |
| CN | 119047709 A | 11/2024 | |
| CN | 119222509 A | 12/2024 | |
| JP | 2016205781 A | 12/2016 | |

OTHER PUBLICATIONS

Liu, Shangjunnan et al., Optimization of Structural Parameters of Jet End in the Underwater Intelligent Pigging Robot, Ocean Engineering, 2020, 16 pages.

Notification to Grant Patent Right for Invention in Chinese Application No. 202510352906.8 mailed on May 20, 2025, 4 pages.

First Office Action in Chinese Application No. 202510352906.8 mailed on Apr. 30, 2025, 10 pages.

* cited by examiner

<u>200</u>

A smart gas company management platform obtains, through a smart gas company sensor network platform, pollutant discharge working data and gas monitoring data obtained by a smart gas device object platform, and stores the pollutant discharge working data and the gas monitoring data in a gas database.

210

The smart gas company management platform determines a pipeline cleaning parameter based on the pollutant discharge working data and the gas monitoring data, and uploads the pipeline cleaning parameter to a smart gas government safety monitoring management platform.

220

The smart gas government safety monitoring management platform generates a cleaning regulation instruction based on the pipeline cleaning parameter, and sends the cleaning regulation instruction to the smart gas device object platform to control a target pollutant discharge device to perform cleaning based on the cleaning working parameter.

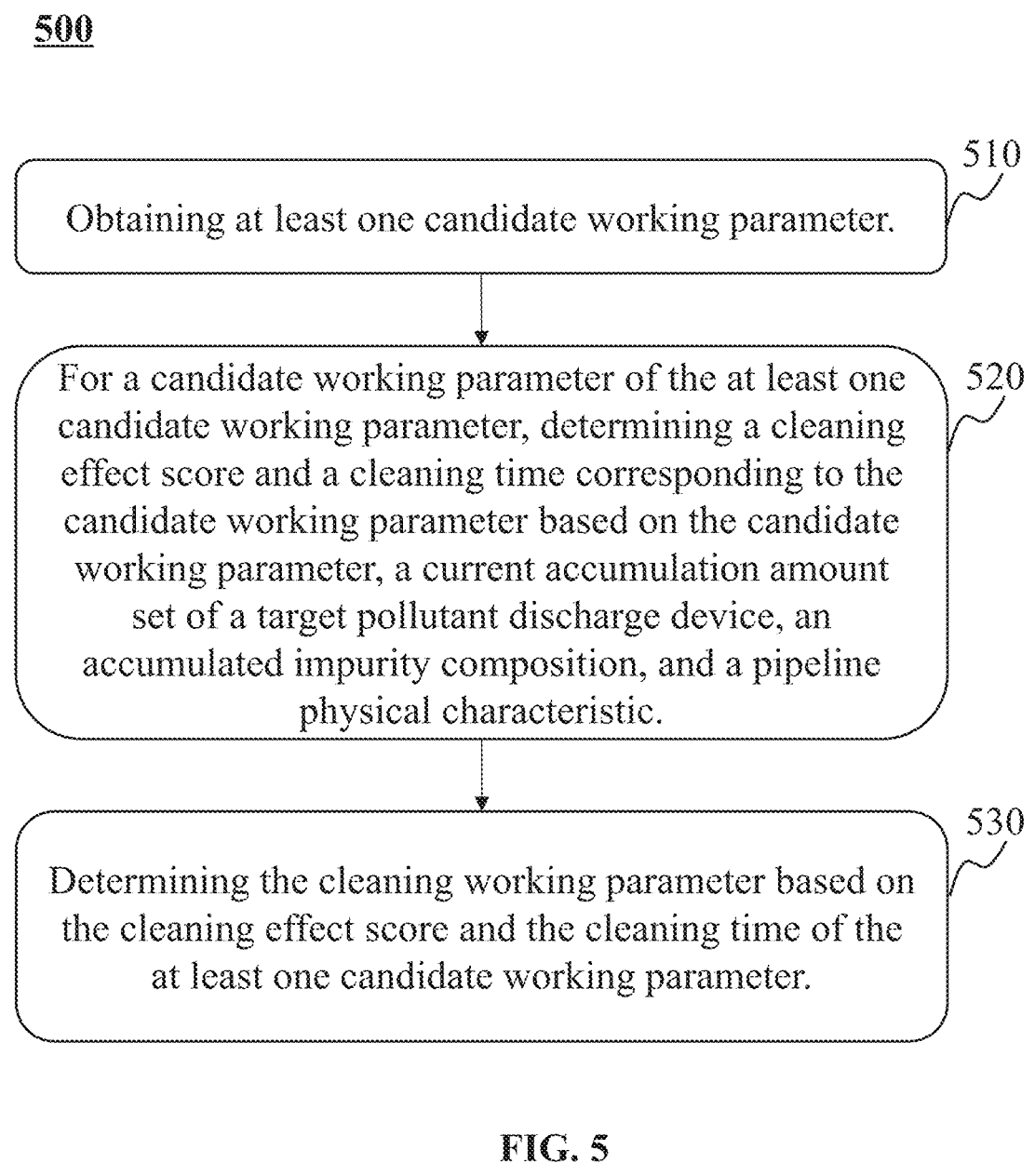

510
Obtaining at least one candidate working parameter.

520
For a candidate working parameter of the at least one candidate working parameter, determining a cleaning effect score and a cleaning time corresponding to the candidate working parameter based on the candidate working parameter, a current accumulation amount set of a target pollutant discharge device, an accumulated impurity composition, and a pipeline physical characteristic.

530
Determining the cleaning working parameter based on the cleaning effect score and the cleaning time of the at least one candidate working parameter.

FIG. 5

METHOD, SYSTEM, AND STORAGE MEDIUM FOR PIPELINE CLEANING BASED ON SMART GAS SUPERVISION INTERNET OF THINGS (IOT)

CROSS-REFERENCE TO RELATED APPLICATIONS

This application claims priority to Chinese Patent Application No. 202510352906.8, filed on Mar. 25, 2025, the entire contents of which are hereby incorporated by reference.

TECHNICAL FIELD

The present disclosure relates to the field of Internet of Things (IoT) technology, and in particular relates to a method, a system, and a storage medium for pipeline cleaning based on smart gas supervision Internet of Things (IoT).

BACKGROUND

When an urban gas pipeline system transports gas to a gas user, the gas may be filtered through a pollutant discharge device, thus filtered impurities may accumulate in a pollutant discharge pipeline of the pollutant discharge device. After a period of time, excessive accumulation of impurities in the pollutant discharge pipeline may affect a subsequent gas filtration effect and the quality of downstream gas.

To achieve automated cleaning of a gas filtration device, CN111359333B proposes a system for automated filter cleaning and pollutant discharge for gas. The system uses pressure difference data collected by an electric control cabinet to initiate an automatic cleaning operation when a pressure difference reaches a specified value, and switches a pipeline connection from a gas outlet to a gas inlet to avoid affecting the quality of downstream gas. However, the system only determines whether to perform pollutant discharge cleaning based on empirically set specified values, and fails to systematically evaluate whether pollutant discharge cleaning is necessary based on various data, as well as an impact of pollutant discharge cleaning on a downstream pipeline.

Therefore, it is desirable to provide a method, a system, and a storage medium for pipeline cleaning based on smart gas supervision Internet of Things (IoT) to accurately determine a target pollutant discharge device and a cleaning working parameter corresponding to the target pollutant discharge device.

SUMMARY

One or more embodiments provide a method for pipeline cleaning based on smart gas supervision Internet of Things (IoT). The method is executed by an Internet of Things (IoT) system for smart gas supervision. The IoT system comprises a smart gas government safety monitoring management platform, a smart gas government safety supervision sensor network platform, a smart gas government safety supervision object platform, a smart gas company sensor network platform, and a smart gas device object platform. The smart gas government safety supervision object platform includes a smart gas company management platform. The smart gas company management platform includes a gas database, the gas database being configured as a storage device. The smart gas government safety monitoring management platform and the smart gas company management platform are configured as servers. The smart gas government safety supervision sensor network platform and the smart gas company sensor network platform are configured as communication networks. The smart gas device object platform is configured as a pollutant discharge device and a gas monitoring device. The pollutant discharge device includes at least one of a filtration device and a pollutant discharge pipeline. The gas monitoring device is provided on a gas pipeline. The method comprises: the smart gas company management platform obtaining, through the smart gas company sensor network platform, pollutant discharge working data and gas monitoring data obtained by the smart gas device object platform, and storing the pollutant discharge working data and the gas monitoring data in the gas database; the smart gas company management platform determining a pipeline cleaning parameter based on the pollutant discharge working data and the gas monitoring data, and uploading the pipeline cleaning parameter to the smart gas government safety monitoring management platform, the pipeline cleaning parameter including a target pollutant discharge device and a cleaning working parameter corresponding to the target pollutant discharge device, the cleaning working parameter including a pollutant discharge valve opening level, a monitoring level, and a smart working parameter of a cleaning crawling robot; and the smart gas government safety monitoring management platform generating a cleaning regulation instruction based on the pipeline cleaning parameter, and sending the cleaning regulation instruction to the smart gas device object platform to control the target pollutant discharge device to perform cleaning based on the cleaning working parameter.

One or more embodiments provide an Internet of Things (IoT) system for smart gas supervision, comprising a smart gas government safety monitoring management platform, a smart gas government safety supervision sensor network platform, a smart gas government safety supervision object platform, a smart gas company sensor network platform, and a smart gas device object platform. The smart gas government safety supervision object platform includes a smart gas company management platform. The smart gas company management platform includes a gas database, the gas database being configured as a storage device. The smart gas government safety monitoring management platform and the smart gas company management platform are configured as servers. The smart gas government safety supervision sensor network platform and the smart gas company sensor network platform are configured as communication networks. The smart gas device object platform is configured as a pollutant discharge device and a gas monitoring device. The pollutant discharge device includes at least one of a filtration device and a pollutant discharge pipeline. The gas monitoring device is provided on a gas pipeline. The IoT system is configured to: instruct the smart gas company management platform to obtain, through the smart gas company sensor network platform, pollutant discharge working data and gas monitoring data obtained by the smart gas device object platform, and store the pollutant discharge working data and the gas monitoring data in the gas database; instruct the smart gas company management platform to determine a pipeline cleaning parameter based on the pollutant discharge working data and the gas monitoring data, and upload the pipeline cleaning parameter to the smart gas government safety monitoring management platform, the pipeline cleaning parameter including a target pollutant discharge device and a cleaning working parameter corresponding to the target pollutant discharge device, the cleaning working parameter including a pollutant discharge valve opening level, a monitoring level, and a smart working parameter of a cleaning crawling robot; and instruct the smart gas government safety monitoring management platform to generate a cleaning regulation instruction based on the pipeline cleaning parameter, and send the cleaning regulation instruction to the smart gas device object platform to control the target pollutant discharge device to perform cleaning based on the cleaning working parameter.

One or more embodiments provide a non-transitory computer-readable storage medium storing computer instructions. When reading the computer instructions in the storage medium, a computer implements the method for pipeline cleaning based on smart gas supervision Internet of Things (IoT) described in the present disclosure.

BRIEF DESCRIPTION OF THE DRAWINGS

The present disclosure will be further illustrated by way of exemplary embodiments, which will be described in detail through the accompanying drawings. These embodiments are not limiting, and in these embodiments, the same numbering indicates the same structure, wherein:

FIG. 2 is a flowchart of an exemplary process of a method for pipeline cleaning based on smart gas supervision Internet of Things (IoT) according to some embodiments of the present disclosure;

FIG. 5 is a flowchart of an exemplary process for determining a cleaning working parameter according to some embodiments of the present disclosure.

DETAILED DESCRIPTION

Figure 1:
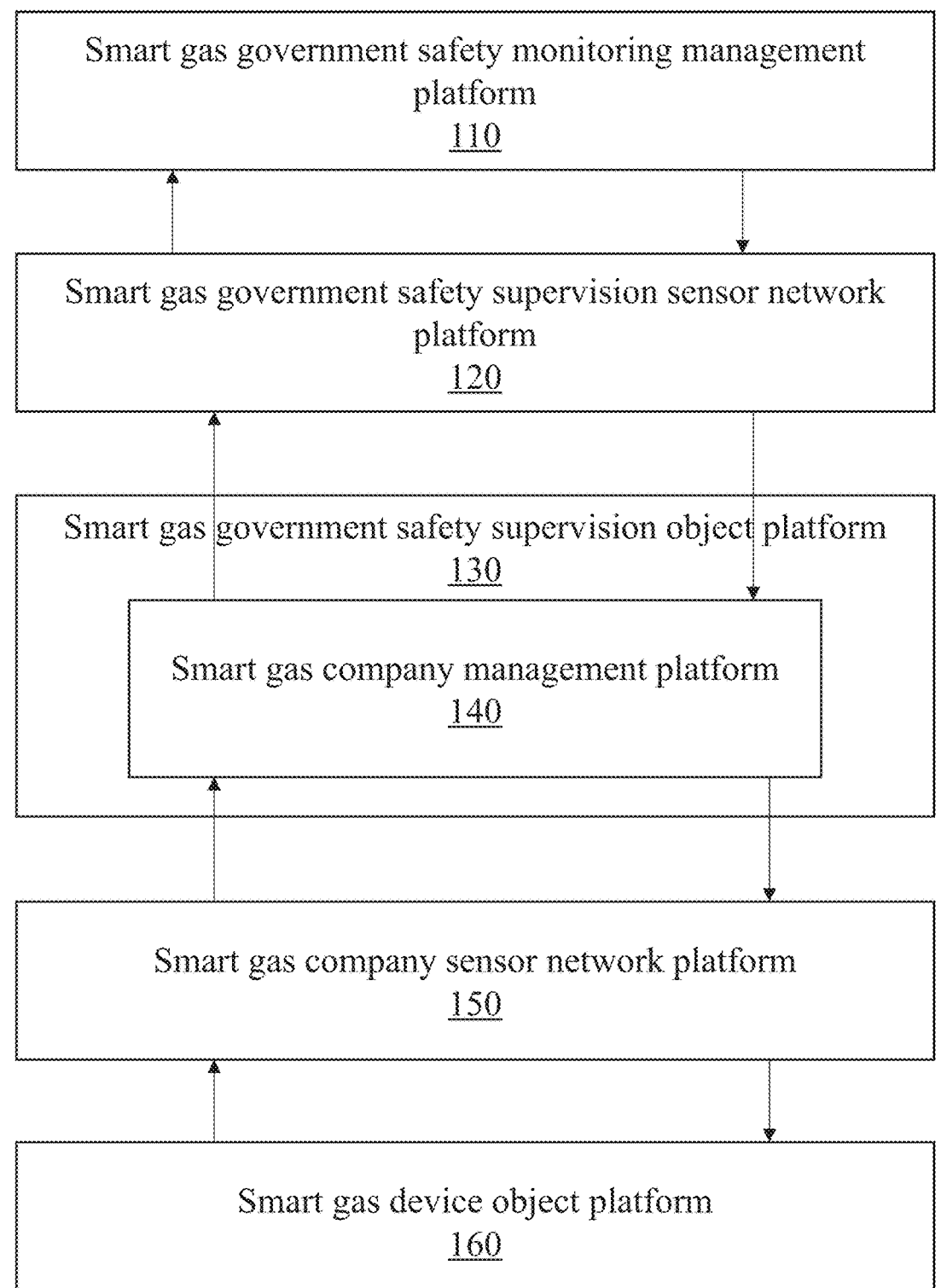
FIG. 1 is a block diagram illustrating exemplary platforms of an Internet of Things (IoT) system for smart gas supervision according to some embodiments of the present disclosure.

To more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system", "device", "unit", and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a", "an", and "the" may be intended to include the plural forms as well, unless the context clearly indicates otherwise. In general, the terms "comprise", "comprises", and/or "comprising", "include", "includes", and/or "including", when used in the present disclosure, specify the presence of stated features, integers, steps, operations, elements, and/or components, but do not preclude the presence or addition of one or more other features, integers, steps, operations, elements, components, and/or groups thereof.

Embodiments of the present disclosure, the steps are performed according to the steps. If there is no special description, the order of the steps is adjustable, the steps may be omitted, and other steps may also be included in the operation process.

FIG. 1 is a block diagram illustrating exemplary platforms of an Internet of Things (IoT) system for smart gas supervision according to some embodiments of the present disclosure. The Internet of Things (IoT) system for smart gas supervision provided in some the embodiments of the present disclosure will be described in detail below. It should be noted that the following embodiments are used only for explaining the present disclosure and do not constitute a limitation of the present disclosure.

In some embodiments, as shown in FIG. 1, an Internet of Things (IoT) system 100 for smart gas supervision (hereinafter referred to as the IoT system 100) includes a smart gas government safety monitoring management platform 110, a smart gas government safety supervision sensor network platform 120, a smart gas government safety supervision object platform 130, a smart gas company sensor network platform 150, and a smart gas device object platform 160.

The smart gas government safety monitoring management platform 110 refers to a platform where a government user coordinates and manages connections and collaborations among various functional platforms to aggregate all information from the IoT system and provides sensing management and control management functions for an operations of the IoT system.

In some embodiments, the smart gas government safety monitoring management platform 110 is configured as a server.

The server may be configured to process data related to the IoT system 100. In some embodiments, the server is a single server or a server group. In some embodiments, the server group is centralized or distributed.

The smart gas government safety supervision sensor network platform 120 refers to a functional platform for managing sensor communications. In some embodiments, the smart gas government safety supervision sensor network platform 120 has functions of sensing information sensor communication and controlling information sensor communication.

In some embodiments, the smart gas government safety supervision sensor network platform 120 connects the smart gas government safety monitoring management platform 110 and the smart gas government safety supervision object platform 130 to realize information interaction among the smart gas government safety supervision sensor network platform 120, the smart gas government safety monitoring management platform 110, and the smart gas government safety supervision object platform 130.

In some embodiments, the smart gas government safety supervision sensor network platform 120 is configured as a communication network.

In some embodiments, the communication network includes a suitable network capable of facilitating the exchange of at least one of information and data for the IoT system 100. In some embodiments, the smart gas government safety monitoring management platform 110 obtains at least one of information and data from the smart gas government safety supervision object platform 130 through the communication network.

The smart gas government safety supervision object platform 130 refers to a functional platform for sensing information generation and controlling information execution.

In some embodiments, the smart gas government safety supervision object platform 130 includes a smart gas company management platform 140.

In some embodiments, the smart gas company management platform 140 includes a gas database.

In some embodiments, the gas database is a storage device.

The gas database refers to a database that stores information related to the IoT system 100. In some embodiments, the gas database is configured to store information such as pollutant discharge working data, gas monitoring data, or the like. More descriptions regarding the pollutant discharge working data and the gas monitoring data may be found elsewhere in the present disclosure (e.g., FIG. 2 and related descriptions thereof)

The storage device is a device that stores data and information. The storage device may include various types of memory. For example, the storage device may include a Random Access Memory (RAM), a Read-Only Memory (ROM), or the like.

The smart gas company sensor network platform 150 refers to a functional platform that manages sensing communications. In some embodiments, the smart gas company sensor network platform 150 realizes the functions of sensing information sensor communication and controlling information sensor communication.

In some embodiments, the smart gas government safety supervision object platform 130 obtains gas related data from the smart gas device object platform 160 through the smart gas company sensor network platform 150.

In some embodiments, the smart gas device object platform is configured as various types of gas pipeline network devices and monitoring devices. For example, the smart gas device object platform is configured as a pollutant discharge device and a gas monitoring device.

The pollutant discharge device refers to a device that filters and discharges pollutants from gas flowing through the device. In some embodiments, the pollutant discharge device includes a filtration device, a pollutant discharge pipeline, or the like.

The filtration device refers to a device for filtering gas. In some embodiments, the filtration device includes a filtration element. For example, the filtration element may be a metal filter screen, a fiber filter, or the like.

The pollutant discharge pipeline refers to a pipeline that is used to collect and discharge impurities produced during filtration.

In some embodiments, when the filtration device filters the gas, the filtered impurities adhere to and accumulate in the pollutant discharge pipeline. The more impurities accumulate in the pollutant discharge pipeline, the more likely it is to cause clogging. At the same time, the poorer a filtration efficiency of the filtration device is, the more impurities the gas delivered to a downstream pipeline carries. Therefore, it is necessary to clean the pollutant discharge pipeline.

The gas monitoring device refers to a device configured to monitor gas data. For example, the gas monitoring device may be a pressure sensor, a temperature sensor, a flow sensor, a flow rate sensor, a gas composition monitor, or the like.

In some embodiments, the gas monitoring device monitors a parameter of the gas in a gas pipeline. For example, the parameter of the gas in the gas pipeline includes pressure data, temperature data, flow data, flow velocity data, gas composition data, or the like.

In some embodiments, the gas monitoring device is provided on the gas pipeline.

In some embodiments of the present disclosure, based on the IoT system 100, an information operation closed loop can be formed between the smart gas government safety monitoring management platform 110 and the smart gas device object platform 160. Under a unified management of the smart gas company management platform 140, the IoT system 100 operates in a coordinated and regular manner, achieving intelligent and information-based pipeline cleaning management based on the IoT system 100.

It should be noted that the above descriptions of the IoT system for smart gas supervision are only for the convenience of description and do not limit the present disclosure to the scope of the cited embodiments.

FIG. 2 is a flowchart of an exemplary process of a method for pipeline cleaning based on smart gas supervision Internet of Things (IoT) according to some embodiments of the present disclosure. As shown in FIG. 2, process 200 includes the following operations. In some embodiments, process 200 is implemented by the IoT system 100.

In 210, the smart gas company management platform 140 obtains, through the smart gas company sensor network platform 150, pollutant discharge working data and gas monitoring data obtained by the smart gas device object platform 160, and stores the pollutant discharge working data and the gas monitoring data in a gas database.

In some embodiments, operation 210 is performed based on the smart gas company management platform 140.

The pollutant discharge working data refers to a working parameter related to an operation of a pollutant discharge device. For example, the pollutant discharge working data includes a working duration, a pressure drop, a filtration accuracy, a working temperature, etc., of the pollutant discharge device.

The working duration refers to a duration from the completion of a last cleaning operation of the pollutant discharge device to current time.

The pressure drop refers to a loss of pressure when a fluid (e.g., gas, etc.) flows through the pollutant discharge device.

The filtration accuracy refers to a size of a solid particle that may be filtered out from the fluid by the pollutant discharge device.

The working temperature refers to a temperature of the pollutant discharge device during operation.

More descriptions regarding the pollutant discharge device may be found elsewhere in the present disclosure (e.g., FIG. 1 and related descriptions thereof)

In some embodiments, the smart gas company management platform 140 obtains the pollutant discharge working data of the pollutant discharge device based on the smart gas device object platform 160 (e.g., a sensor, a monitoring device, etc.). For example, the smart gas company management platform 140 obtains the working duration of the pollutant discharge device through a timer, or the like. As another example, the smart gas company management platform 140 obtains the pressure drop of the pollutant discharge device through a pressure sensor. As yet another example, the smart gas company management platform 140 obtains the filtration accuracy of the pollutant discharge device directly through the smart gas device object platform 160, and the filtration accuracy is regulated by the smart gas device object platform 160. As a further example, the smart gas company management platform 140 obtains the working temperature of the pollutant discharge device through a temperature sensor.

The gas monitoring data refers to gas-related data collected by the gas monitoring device. For example, the gas monitoring data includes pressure data, temperature data, flow rate data, flow velocity data, gas composition data, or the like. The flow rate data refers to a volume of gas passing through a pipeline within a unit time period (e.g., 0.5 hours, 1 hour, 2 hours, etc.)

More descriptions regarding the gas monitoring device may be found elsewhere in the present disclosure (e.g., FIG. 1 and related descriptions thereof)

In some embodiments, the smart gas company management platform 140 obtains the pollutant discharge working data of the pollutant discharge device based on the gas monitoring device provided on the gas pipeline.

In some embodiments, the smart gas company management platform 140 stores the pollutant discharge working data and the gas monitoring data into the gas database of the smart gas company management platform 140.

In 220, the smart gas company management platform 140 determines a pipeline cleaning parameter based on pollutant discharge working data and gas monitoring data, and uploads the pipeline cleaning parameter to the smart gas government safety monitoring management platform 110.

In some embodiments, operation 220 is performed by the smart gas company management platform 140.

The pipeline cleaning parameter refers to relevant data during a pipeline cleaning operation. For example, the pipeline cleaning parameter includes a target pollutant discharge device and a cleaning working parameter corresponding to the target pollutant discharge device, or the like.

The target pollutant discharge device refers to a pollutant discharge device that needs to be cleaned. For example, the target pollutant discharge device is a filtration device that needs to be cleaned, a pollutant discharge pipeline that needs to be cleaned, or the like.

The cleaning working parameter refers to a parameter that characterizes the cleaning operation. For example, the cleaning working parameter includes a pollutant discharge valve opening level, a monitoring level, a smart working parameter of a cleaning crawling robot, or the like.

The pollutant discharge valve opening level refers to a numerical or alphabetical value that reflects a degree to which a pollutant discharge valve is opened during cleaning. For example, the pollutant discharge valve opening level is represented by a value. The larger the value is, the higher the pollutant discharge valve opening level is and the larger the degree to which the pollutant discharge valve is opened.

The monitoring level refers to a numerical or alphabetical value that reflects a monitoring frequency and a monitoring accuracy of the target pollutant discharge device during cleaning. For example, the monitoring level is represented by a value. The larger the value is, the higher the monitoring level is, i.e., the greater the monitoring frequency is and the higher the monitoring accuracy is.

In some embodiments, the monitoring level is positively correlated with the monitoring frequency and the monitoring accuracy.

The monitoring frequency refers to a frequency at which the target pollutant discharge device is monitored during cleaning. For example, the monitoring frequency may be 10 times per hour, or the like, for the target pollutant discharge device.

The monitoring accuracy refers to an amount of data collected in each collection interval. Merely by way of example, if the smart gas company management platform 140 collects data at an interval of 1 hour with a monitoring accuracy of 5, it represents that the smart gas company management platform 140 collects data 5 times continuously with each hour.

In some embodiments, different monitoring levels correspond to different monitoring frequencies and monitoring accuracies. For example, the higher the monitoring level is, the greater the monitoring frequency is and the higher the monitoring accuracy is.

The cleaning crawling robot refers to an automatic device equipped with cleaning tools.

In some embodiments, the cleaning crawling robot may select different cleaning tools appropriate for different degrees of contamination. For example, a brush is selected for light contamination and used to remove surface dust and minor attachments. A scraper is selected for heavier dirt or hard deposits. A high-pressure water gun is used to eject a water stream, dissolving and flushing away stubborn impurities.

In some embodiments, the cleaning crawling robot is also capable of selectively carrying vacuum cleaners with different functions, using suction to draw impurities into a dust collection bag or a container for later disposal, thereby meeting cleaning needs of different pollutant discharge devices. For example, when the cleaning crawling robot is equipped with a magnetic vacuum cleaner, it utilizes a magnetic field to remove iron or a magnetic substance from the pollutant discharge device. As another example, when the cleaning crawling robot is equipped with a standard vacuum cleaner, it generates a powerful airflow to suck in dust, dirt, and other small particles, which are then drawn into the dust collection bag or the container through a suction nozzle or a brush.

The smart working parameter refers to a working parameter when the cleaning crawling robot performs a cleaning task. For example, the smart working parameter includes a moving velocity of the cleaning crawling robot, a cleaning intensity of the cleaning crawling robot, a count of repeated cleaning times of the cleaning crawling robot, or the like.

The moving velocity refers to a velocity of the cleaning crawling robot during pipeline cleaning. For example, the moving velocity may be 1 m/s, or the like.

In some embodiments, the smart gas company management platform 140 adjusts the moving velocity based on a pipeline complexity level and a cleaning difficulty level. Merely by way of example, the higher the pipeline complexity level and the cleaning difficulty level are, the slower the moving velocity of the cleaning crawling robot is.

The cleaning intensity refers to a force exerted on pollutants by the cleaning tool or a device of the cleaning crawling robot. For example, the cleaning intensity is represented by a value. The larger the value is, the greater the cleaning intensity is.

In some embodiments, the greater a cleaning strength of the brush, a cleaning strength of the scraper, and a strength and a flow velocity of the water stream ejected by the high-pressure water gun are, the greater the cleaning intensity of the cleaning crawling robot is.

In some embodiments, the smart gas company management platform 140 adjusts the cleaning intensity based on an intensity of the cleaning task. Merely by way of example, the greater the intensity of the cleaning task is, the greater the cleaning intensity of the cleaning crawling robot is.

The count of repeated cleaning times refers to a count of times the cleaning crawling robot repeatedly cleans the target pollutant discharge device. For example, the count of repeated cleaning times may be 5 times, or the like.

In some embodiments, the smart gas company management platform 140 determines a target pollutant discharge pipeline in the pipeline cleaning parameter in a plurality of ways. For example, the smart gas company management platform 140 determines a pollutant discharge device as the target pollutant discharge device if the working duration of the pollutant discharge device exceeds a duration threshold, a total amount of filtered gas per unit time period by of the pollutant discharge device is lower than a filtration threshold, and a filtration score of the pollutant discharge device is lower than a score threshold.

The duration threshold refers to a threshold for determining whether the working duration of the pollutant discharge device is too long. In some embodiments, the time threshold is set by a skilled technician or by system default.

The total amount of filtered gas per unit time period refers to a total amount of gas filtered by the pollutant discharge device in a unit time period (e.g., 1 min, 30 min, 60 min, etc.).

In some embodiments, the smart gas company management platform 140 obtains the total amount of gas filtered by the pollutant discharge device per unit of time period based on the flow rate data in the gas monitoring data.

The filtration threshold refers to a threshold used to determine whether the total amount of gas filtered by the pollutant discharge device per unit of time period is too small. In some embodiments, the filtration threshold is set by a skilled technician or by system default.

The filtration score refers to a quantitative assessment of a filtration effect of the pollutant discharge device, which reflects a current working status and a performance of the pollutant discharge device.

In some embodiments, the smart gas company management platform 140 determines the filtration score through a predetermined rule based on a reduction of impurity amounts before and after pollutant discharge and a gas filtration flow rate. The first predetermined rule includes that the filtration score is positive correlated to the reduction of impurity amounts before and after pollutant discharge and the gas filtration flow rate.

The score threshold refers to a threshold for determining whether the filtration effect of the pollutant discharge device is at an acceptable level. In some embodiments, if the filtration score is lower than the score threshold, it may indicate that the pollutant discharge device needs to be cleaned. In some embodiments, the score threshold is set by a skilled technician or system default.

In some embodiments, the smart gas company management platform 140 determines the cleaning working parameter corresponding to the target pollutant discharge pipeline in the pipeline cleaning parameter in a plurality of ways. For example, the smart gas company management platform 140 determines the pollutant discharge valve opening level, the monitoring level, and the smart working parameter through a second predetermined rule based on the flow rate data. The second predetermined rule includes that the pollutant discharge valve opening level, the monitoring level, and the smart working parameter are positive correlated to the flow rate data.

As another example, the smart gas company management platform 140 determines the pollutant discharge valve opening level, the monitoring level, and the smart working parameter through a third predetermined rule based on the flow rate data and a pipeline importance score. The third predetermined rule includes that the pollutant discharge valve opening level, the monitoring level, and the smart working parameter are positive correlated to the gas flow data and the pipeline importance score.

Figure 3:
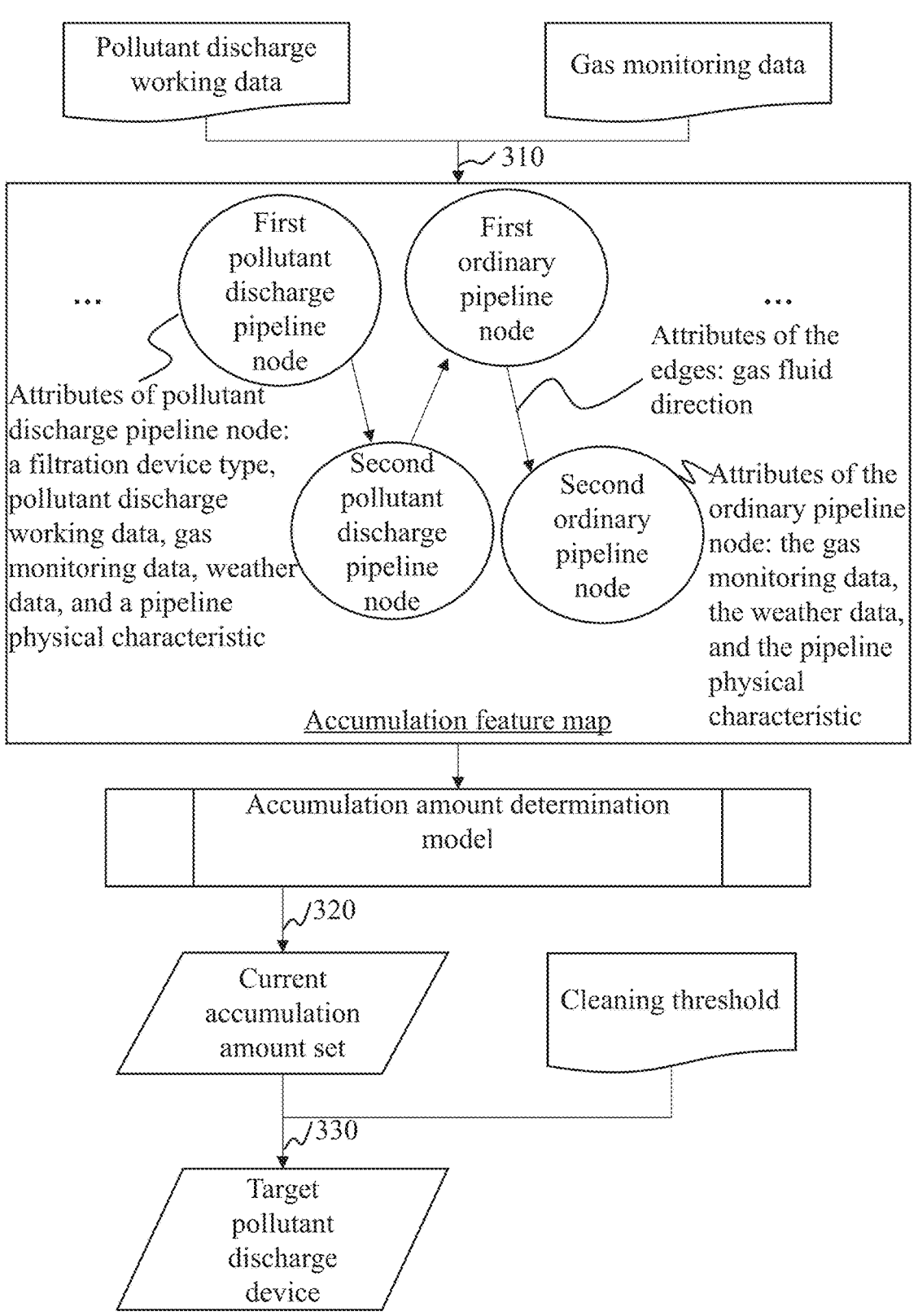
FIG. 3 is a flowchart of an exemplary process for determining a target pollutant discharge device according to some embodiments of the present disclosure.

More descriptions regarding the pipeline importance score may be found elsewhere in the present disclosure (e.g., FIG. 3 and related descriptions thereof)

Figure 4:
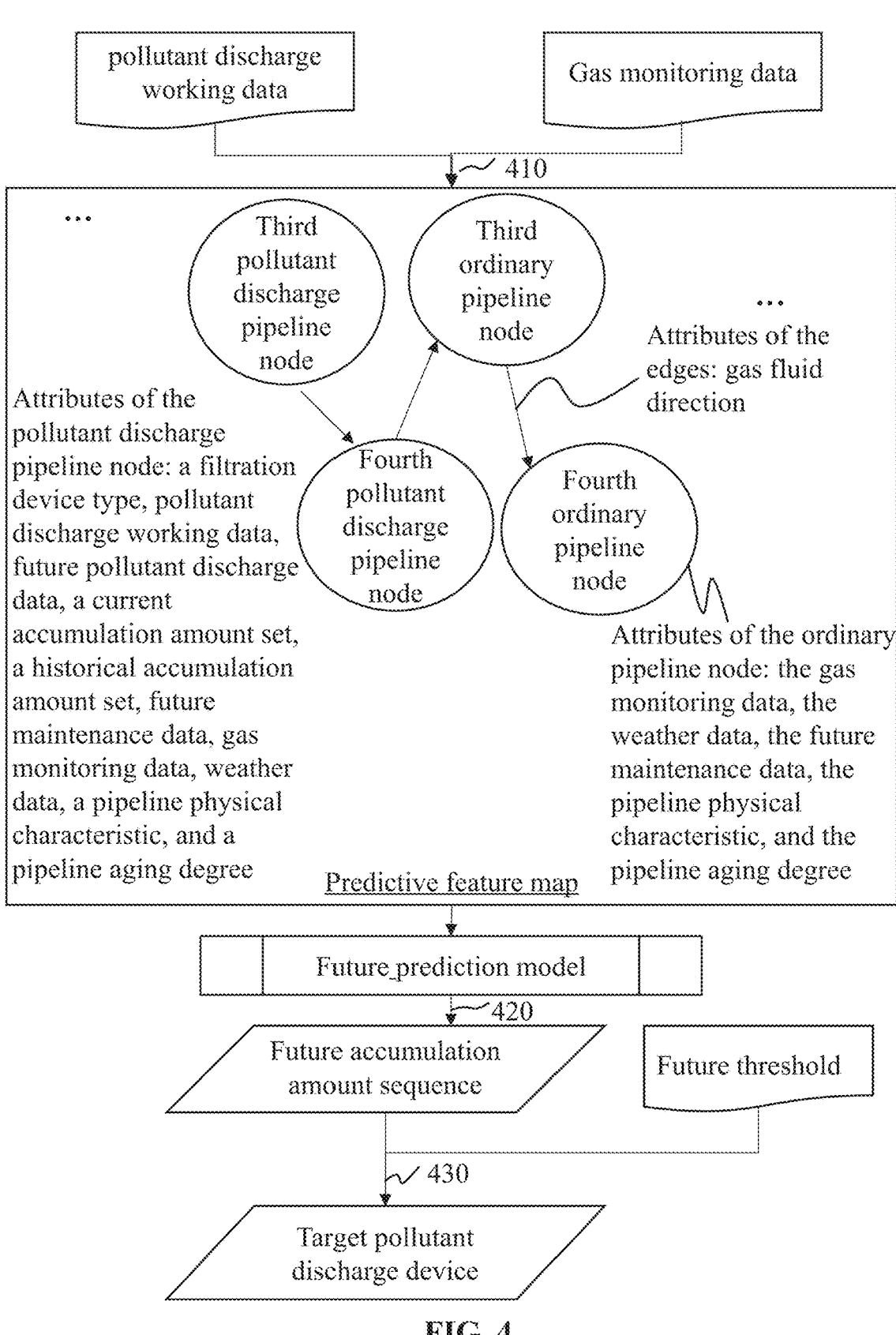
FIG. 4 is a flowchart of another exemplary process for determining a target pollutant discharge device according to some embodiments of the present disclosure.

More descriptions regarding the determination of the pipeline cleaning parameter based on the pollutant discharge working data and the gas monitoring data may be found elsewhere in the present disclosure (e.g., FIGS. 3-5 and related descriptions thereof)

In some embodiments, the smart gas company management platform 140 uploads the pipeline cleaning parameter to the smart gas government safety monitoring management platform 110 via the smart gas government safety supervision sensor network platform 120.

In 230, the smart gas government safety monitoring management platform 110 generates a cleaning regulation instruction based on the pipeline cleaning parameter, and sends the cleaning regulation instruction to the smart gas device object platform 160 to control the target pollutant discharge device to perform cleaning based on the cleaning working parameter.

In some embodiments, operation 230 is performed by the smart gas government safety monitoring management platform 110.

The cleaning regulation instruction refers to an instruction configured to control the target pollutant discharge device to perform cleaning based on the pipeline cleaning parameter.

In some embodiments, the cleaning regulation instruction includes an indirect regulation instruction, the indirect regulation instruction is configured to increase the monitoring level of the gas monitoring device on an affected pipeline when the gas monitoring device cleans the target pollutant discharge device.

The affected pipeline refers to a pipeline associated with the pollutant discharge pipeline corresponding to the target pollutant discharge device.

In some embodiments, the smart gas government safety monitoring management platform 110 determines distances between the target pollutant discharge device and downstream pollutant discharge pipelines, and designate a downstream pollutant discharge pipeline with a distance that is within a distance threshold as the affected pipeline.

A downstream pollutant discharge pipeline refers to a pollutant discharge pipeline that follows the pollutant discharge pipeline corresponding to the target pollutant discharge device along a gas flow direction.

The gas flow direction refers to a direction in which gas flows.

The distance threshold refers to a threshold used to determine whether a pollutant discharge pipeline may be determined as the affected pipeline. For example, the distance threshold may be 100 meters, etc.

In some embodiments, the smart gas government safety monitoring management platform 110 determines the distance threshold based on the flow rate of the pollutant discharge pipeline corresponding to the target pollutant discharge device by querying a predetermined relationship table.

In some embodiments, the predetermined relationship table includes the flow rate data of the pollutant discharge pipeline corresponding to the target pollutant discharge device and an actual distance threshold. Merely by way of example, the distance threshold in the predetermined relationship table is positively correlated with the flow rate of the pollutant discharge pipeline corresponding to the target pollutant discharge device.

In some embodiments of the present disclosure, during cleaning, switching pollutant discharge pipelines may cause gas fluctuations (e.g., changes in the flow rate and pressure). Therefore, it is necessary not only to adjust the monitoring level of the target pollutant discharge device but also to increase the monitoring level of the gas monitoring device on the affected pipeline, thereby ensuring real-time monitoring of all affected downstream pollutant discharge pipelines, enhancing monitoring priority, and effectively preventing unexpected incidents.

In some embodiments, the smart gas government safety monitoring management platform 110 generates the cleaning regulation instruction based on the pipeline cleaning parameter, and sends the cleaning regulation instruction to the smart gas device object platform 160.

In some embodiments of the present disclosure, through a collaboration between the smart gas company management platform 140 and the smart gas company sensor network platform 150, the pollutant discharge working data and the gas monitoring data collected by the smart gas device object platform 160 can be effectively obtained and stored to the gas database. In addition, the smart gas company management platform 140 may determine the pipeline cleaning parameter based on the pollutant discharge working data and the gas monitoring data, and upload the pipeline cleaning parameter to the smart gas government safety monitoring management platform 110. Subsequently, the smart gas government safety monitoring management platform 110 may use the pipeline cleaning parameter to generate the cleaning regulation instruction, and issue the cleaning regulation instruction to the smart gas device object platform 160 to accurately control the target pollutant discharge device to operate based on the cleaning working parameter, thereby ensuring timely, efficient, safe, and compliant pipeline cleaning operations.

It should be noted that the foregoing descriptions of process 200 are intended to be merely exemplary and illustrative, and do not limit the scope of application of the present disclosure. For a person skilled in the art, various corrections and changes may be made to process 200 under the guidance of the present disclosure. However, these corrections and changes remain within the scope of the present disclosure.

FIG. 3 is a flowchart of an exemplary process for determining a target pollutant discharge device according to some embodiments of the present disclosure. As shown in FIG. 3, process 300 includes the following operations. In some embodiments, process 300 is performed by the smart gas company management platform 140.

In some embodiments, the smart gas company management platform 140 constructs an accumulation feature map based on pollutant discharge working data and gas monitoring data, determines a current accumulation amount set based on the accumulation feature map using an accumulation amount determination model, the accumulation amount determination model being a machine learning model, and determines a target pollutant discharge device based on the current accumulation amount set and a cleaning threshold. The accumulation feature map includes nodes and edges, the nodes include a pollutant discharge pipeline node and an ordinary pipeline node. Attributes of the pollutant discharge pipeline node include a filtration device type, the pollutant discharge working data, the gas monitoring data, weather data, and a pipeline physical characteristic. Attributes of the ordinary pipeline node include the gas monitoring data, the weather data, and the pipeline physical characteristic. The edges include lines between physically connected nodes, and attributes of the edges include a gas flow direction. The pollutant discharge working data includes current pollutant discharge data and historical pollutant discharge data, the gas monitoring data includes current monitoring data and historical monitoring data, and the weather data includes current weather data and historical weather data.

In 310, constructing an accumulation feature map based on pollutant discharge working data and gas monitoring data.

The accumulation feature map refers to a knowledge graph used to represent a distribution and attributes of at least one pollutant discharge pipeline and at least one ordinary pipeline. In some embodiments, the accumulation feature map includes at least one node and at least one edge. The at least one node is connected by the at least one edge, and the at least one node and the at least one edge have attributes.

In some embodiments, nodes of the accumulation feature map include a pollutant discharge pipeline node and an ordinary pipeline node.

In some embodiments, the pollutant discharge pipeline node corresponds to a pollutant discharge pipeline in a predetermined region.

In some embodiments, the attributes of the pollutant discharge pipeline node reflect characteristics of the pollutant discharge pipeline node. For example, the attributes of the pollutant discharge pipeline node include at least one of a filtration device type, pollutant discharge working data, the gas monitoring data, weather data, and a pipeline physical characteristic. The predetermined region may include a city, a neighborhood, a street, or the like.

The filtration device type refers to a type of device that is installed at the pollutant discharge pipeline node for filtering impurities from gas. For example, the filtration device type includes a bag filter, an activated carbon filter, or the like.

In some embodiments, the pollutant discharge working data includes current pollutant discharge data and historical pollutant discharge data.

The current pollutant discharge data refers to a working parameter recorded during a current operation of a pollutant discharge device. The historical pollutant discharge data refers to a working parameter corresponding to the pollutant discharge device during a historical preset time period.

More descriptions regarding the pollutant discharge working data may be found elsewhere in the present disclosure (e.g., FIG. 2 and related descriptions thereof)

In some embodiments, the gas monitoring data includes current monitoring data and historical monitoring data.

The current monitoring data refers to gas monitoring data obtained during a current operation of the gas monitoring device, and the historical monitoring data refers to gas monitoring data obtained by the gas monitoring device during a historical preset time period.

More descriptions regarding the gas monitoring data may be found elsewhere in the present disclosure (e.g., FIG. 2 and related descriptions thereof)

The weather data refers to climatic condition data associated with a region where the nodes of the accumulation feature map are located. For example, the weather data includes a temperature, a humidity, or the like.

In some embodiments, the weather data includes historical weather data and current weather data.

In some embodiments, the smart gas company management platform 140 obtains the weather data based on the smart gas device object platform 160 (e.g., a temperature sensor, a humidity sensor, etc.).

The pipeline physical characteristic refers to a physical attribute corresponding to the pollutant discharge pipeline. For example, the pipeline physical characteristic includes pipeline material data, a shape, a size, a length, etc. corresponding to the pollutant discharge pipeline.

In some embodiments, the ordinary pipeline node corresponds to an ordinary pipeline in the predetermined region.

In some embodiments, the attributes of the ordinary pipeline node reflect characteristics of the ordinary pipeline node. For example, the attributes of the ordinary pipeline node include at least one of the gas monitoring data, the weather data, and the pipeline physical characteristic.

The ordinary pipeline refers to a gas transmission pipeline that is not equipped with a filtration device.

In some embodiments, when pipelines corresponding to two nodes are physically connected, a line between the two nodes forms an edge. In some embodiments, the edge is directed, and attributes of the edges include a gas flow direction.

In some embodiments, the smart gas company management platform 140 constructs the accumulation feature map based on the nodes, the edges, the attributes of the nodes, and the attributes of the edges.

In 320, determining a current accumulation amount set using an accumulation amount determination model based on the accumulation feature map.

The current accumulation amount set refers to a set consisting of pipelines corresponding to the nodes in the accumulation feature map and impurity accumulation amounts corresponding to the pipelines. For example, the current accumulation amount set is denoted by $\{(A_1, B_1), (A_2, B_2), \ldots, (A_i, B_i), \ldots, (A_n, B_n)\}$. $A_i$ denotes the pipelines corresponding to the nodes in the accumulation feature map, and $B_i$ denotes the impurity accumulation amounts corresponding to the pipelines $A_i$.

The current accumulation amount refers to a total weight of impurities formed by solid particles, sediments, etc., accumulated on an inner wall of the pipeline.

In some embodiments, the smart gas company management platform 140 determines the current accumulation amount set based on the accumulation feature map using the accumulation amount determination model.

The accumulation amount determination model refers to a model for determining the current accumulation amount set. In some embodiments, the accumulation amount determination model is a machine learning model. For example, the accumulation amount determination model is a Graph Neural Network (GNN) model.

An input of the accumulation amount determination model may be the accumulation feature map, and an output of the accumulation amount determination model may be the current accumulation amount set.

In some embodiments, the accumulation amount determination model is acquired through training based on a first sample training set. The first sample training set includes a plurality of sample accumulation feature maps and a first label corresponding to the first sample training set. The first sample training set is input into an initial accumulation amount determination model, a loss function is constructed based on the first label and an output of the initial accumulation amount determination model. Parameters of the initial accumulation amount determination model are iteratively updated based on the loss function, and the iterations are ended when the loss function of the initial accumulation amount determination model satisfies a preset condition.

Then the model training is completed, and the accumulation amount determination model is obtained. The preset condition may be that the loss function converges, a count of iterations reaches a threshold, etc.

In some embodiments, the first sample training set may include the plurality of sample accumulation feature maps. The smart gas company management platform 140 constructs the sample accumulation feature map based on historical pollutant discharge working data and historical gas monitoring data at a first historical moment and before the first historical moment in the first sample training set.

In some embodiments, the first label may be a sample accumulation amount actually collected at the first historical moment corresponding to the first sample training set. For example, the smart gas company management platform 140 detects thicknesses of accumulated impurities based on a cleaning crawling robot equipped with an ultrasonic sensor. The larger an average thickness of the accumulated impurities is, the larger the impurity accumulation amount is.

In some embodiments, the smart gas company management platform 140 determines a total amount of the accumulated impurities as the impurity accumulation amount. As another example, the smart gas company management platform 140 removes the impurities from the pipeline and measure a weight of the impurities to determine the impurity accumulation amount.

In some embodiments, the smart gas company management platform 140 corrects the accumulation amount determination model based on an actual working parameter of the cleaning crawling robot, or provides training samples for further enhancement of the accumulation amount determination model. For example, the smart gas company management platform 140 determines an actual impurity accumulation amount based on an actual thickness of the accumulated impurities. In response to determining that the actual impurity accumulation amount is different from the impurity accumulation amount output by the accumulation amount determination model, it indicates a deviation in the accumulation amount determination model, which may require a correction, such as by adjusting the parameters the accumulation amount determination model. In addition, the actual working parameter of the cleaning crawling robot may provide the training samples for optimization of the accumulation amount determination model.

More descriptions regarding the actual working parameter may be found elsewhere in the present disclosure (e.g., FIG. 5 and related descriptions thereof)

In 330, determining the target pollutant discharge device based on the current accumulation amount set and a cleaning threshold.

The cleaning threshold refers to a threshold used to determine whether the current accumulation amount set is too high.

In some embodiments, the cleaning threshold is set by a skilled technician or by system default.

In some embodiments, the cleaning threshold is correlated to the pipeline physical characteristic, the historical monitoring data, and a pipeline importance score.

More descriptions regarding the pipeline physical characteristic and the historical monitoring data may be found elsewhere in the present disclosure (e.g., operation 310 of FIG. 3 and related descriptions thereof)

The pipeline importance score refers to a value used to characterize an importance level of the pipeline. In some embodiments, the higher the value is, the higher the pipeline importance score is.

In some embodiments, the smart gas company management platform 140 determines the pipeline importance score based on a positive correlation between the pipeline importance score and gas flow data, a count of associated pipelines, and gas flow data of the associated pipelines, using Equation (1):

$$p = a \times x + b \times y + c \times z. \tag{1}$$

In Equation (1), p denotes the pipeline importance score, x denote the gas flow rate data, y denotes the count of the associated pipelines, and z denotes the gas flow data of the associated pipelines. a, b, c are weight coefficients for the gas flow data, the count of the associated pipelines, and the gas flow data of the associated pipelines, respectively, which may be preset.

More descriptions regarding the gas flow data may be found elsewhere in the present disclosure (e.g., FIG. 2 and related descriptions thereof)

An associated pipeline refers to a pipeline whose impurity accumulation amount is influenced by an upstream pollutant discharge pipeline.

In some embodiments, the smart gas company management platform 140 determines the associated pipeline in a plurality of ways. For example, the smart gas company management platform 140 determines the associated pipeline based on historical data. Merely by way of example, in response to determining a decrease of impurities in gas composition data of a pipeline downstream of a pollutant discharge device after the pollutant discharge device has been cleaned, the smart gas company management platform 140 determined the pollutant discharge device as the associated pipeline for the pollutant discharge device.

In some embodiments, for a pollutant discharge pipeline, the smart gas company management platform 140 adjusts the attributes (e.g., the pollutant discharge working data) of the pollutant discharge pipeline node corresponding to the pollutant discharge pipeline in the accumulation feature map. Then, based on an adjusted accumulation feature map, the smart gas company management platform 140 determined an adjusted impurity accumulation amount set using the accumulation amount determination model. Since the impurity accumulation amount in the associated pipeline is influenced by the upstream pollutant discharge pipeline, by comparing a pre-adjusted impurity accumulation amount set (i.e., an actually measure impurity accumulation amount) and a post-adjusted impurity accumulation amount set, a pipeline that is downstream of the pollutant discharge pipeline and shows a discrepancy between the pre-adjusted impurity accumulation amount set and the post-adjusted impurity accumulation amount set is determined as the first associated pipeline corresponding to the pollutant discharge pipeline.

The count of associated pipelines corresponding to a pollutant discharge pipeline refers to a sum of all associated pipelines downstream of the pollutant discharge pipeline.

In some embodiments, the smart gas company management platform 140 determines the cleaning threshold based on a positive correlation between the cleaning threshold and a pipeline length and a filtration score, and a negative correlation between the cleaning threshold and a pipeline inner diameter and the pipeline importance score, using Equation (2):

$$d = k_1 \times e + k_2 \times f + + k_3 \times p + k_4 \times h. \tag{2}$$

In Equation (2), d denotes the cleaning threshold, e denotes the pipeline length, f denotes the pipeline inner diameter, p denotes the pipeline importance score, and h denotes the filtration score. $k_1$, $k_2$, $k_3$, $k_4$ are weighting coefficients for the pipeline length, the pipeline inner diameter, the pipeline importance score, and the filtration score, respectively. In some embodiments, $k_1$ and $k_4$ are positive numbers, while $k_2$ and $k_3$ are negative numbers. $k_1$, $k_2$, $k_3$, and $k_4$ and may be predefined.

In some embodiments of the present disclosure, a same impurity accumulation amount may have different degrees of impact on different pollutant discharge pipelines. Therefore, by considering the pipeline physical characteristic, the historical monitoring data, and the pipeline importance score, conditions of different pollutant discharge pipelines can be assessed in a more comprehensive manner, and more adaptive cleaning thresholds can be set for the different pollutant discharge pipelines, thereby cleaning the pollutant discharge pipelines adaptively.

In some embodiments, in response to determining that the impurity accumulation amount in a pollutant discharge pipeline is greater than the cleaning threshold, the smart gas company management platform determines the pollutant discharge pipeline as the target pollutant discharge device.

In some embodiments of the present disclosure, the accumulation feature map is constructed based on the pollutant discharge working data and the gas monitoring data, and the current accumulation amount set is determined based on the accumulation feature map using the accumulation amount determination model. Constructing the accumulation feature map can provide rich information to enhance an inference ability and an accuracy of the accumulation amount determination model, and help the accumulation amount determination model to better understand and process complex relationships. Determining the current accumulation amount set enables precise identification of pollutant discharge pipelines and impurity accumulation amounts corresponding to the pollutant discharge pipelines, thereby facilitating timely detection and resolution of issues. Based on the current accumulation amount set and the cleaning threshold, the target pollutant discharge device can be identified more efficiently to improve cleaning efficiency.

It should be noted that the foregoing descriptions of process 300 are intended to be exemplary and illustrative only and do not limit the scope of application of the present disclosure. For a person skilled in the art, various corrections and changes may be made to process 300 under the guidance of the present disclosure. However, these corrections and changes remain within the scope of the present disclosure.

In some embodiments, the current accumulation amount set includes at least one pollutant discharge pipeline corresponding to at least one pollutant discharge pipeline node and at least one current impurity accumulation amount of the at least one pollutant discharge pipeline. For a pollutant discharge pipeline corresponding to a pollutant discharge pipeline node of the at least one pollutant discharge pipeline node and a current impurity accumulation amount of the pollutant discharge pipeline, in response to determining that the current impurity accumulation amount is less than the cleaning threshold and greater than a concern threshold, the smart gas company management platform 140 identifies the pollutant discharge pipeline corresponding to the current impurity accumulation amount as a concerned pollutant discharge pipeline, generates a monitoring enhancement instruction, and sends the monitoring enhancement instruction to the smart gas device object platform 160 to increase a monitoring level of the gas monitoring device for the concerned pollutant discharge pipeline.

The concern threshold refers to a threshold used to determine whether a pipeline requires increased monitoring and concern.

In some embodiments, the smart gas company management platform 140 determines the concern threshold using a fourth predetermined rule based on the gas flow data. The fourth predetermined rule includes a negative correlation between the concern threshold and the gas flow data.

The concerned pollutant discharge pipeline refers to a pollutant discharge pipeline whose current impurity accumulation amount does not reach the cleaning threshold but is greater than the concern threshold.

The monitoring enhancement instruction refers to an instruction to increase the monitoring level of the concerned pollutant discharge pipeline.

In some embodiments, a degree of the increased monitoring and concern is obtained by a skilled technician or by system default.

In some embodiments, the smart gas company management platform 140 determines the degree of the increased monitoring and concern using a fifth predetermined rule based on the current impurity accumulation amount of the concerned pollutant discharge pipeline. The fifth predetermined rule includes the degree of the increased monitoring and concern being positively correlated to the current amount of impurity accumulation amount of the concerned pollutant discharge pipeline.

In some embodiments of the present disclosure, increasing the monitoring level allows for early detection before the current impurity accumulation amount approaches the cleaning threshold, thereby enabling timely cleaning and reducing the risk of failures caused by impurity buildup. Additionally, enhancing the monitoring level of the concerned pollutant discharge pipeline avoids resource consumption associated with high-frequency monitoring of all pipelines, thereby achieving effective resource allocation.

In some embodiments, after the target pollutant discharge device is determined based on operations 310 to 330, a pollutant discharge device that is not identified as the target pollutant discharge device is determined as a first pollutant discharge device. In response to determining that at least one first pollutant discharge device is identified, for a first pollutant discharge device of the at least one first pollutant discharge device, the smart gas company management platform 140 obtains a first associated pipeline of the pollutant discharge pipeline corresponding to the first pollutant discharge device based on the gas monitoring data, and determines the target pollutant discharge device based on the current accumulation amount set, the first associated pipeline, and an association threshold.

A first pollutant discharge device refers to a pollutant discharge device not identified as the target pollutant discharge device.

The first associated pipeline refers to an associated pipeline of the pollutant discharge pipeline corresponding to the first pollutant discharge device.

More descriptions regarding the associated pipeline may be found elsewhere in the present disclosure (e.g., operation 330 of FIG. 3 and related descriptions thereof)

In some embodiments, a manner for obtaining the first associated pipeline is similar to the manner for obtaining the associated pipeline, more descriptions of which may be found in operation 330 of FIG. 3 and related descriptions thereof.

The association threshold refers to a threshold used to determine whether the impurity accumulation amount in the associated pipeline is too high.

In some embodiments, different first associated pipelines correspond to different association thresholds. Since physical characteristics, usage conditions, and importance scores of different first associated pipelines may be different, by setting different association thresholds for different first associated pipelines, it is possible to more accurately reflect the characteristics of each first associated pipeline, thereby improving an accuracy for the determination of the first associated pipeline.

In some embodiments, the association threshold for a first associated pipeline is negatively correlated to the pipeline inner diameter of the first associated pipeline and positively correlated to the pipeline importance score of the first associated pipeline.

In some embodiments, for a first pollutant discharge device of the at least one first pollutant discharge device, the smart gas company management platform 140 determines the current impurity accumulation amount of the first associated pipeline corresponding to the first pollutant discharge device based on the current accumulation amount set. Then the smart gas company management platform 140 determines a count of its first associated pipelines in which the current impurity accumulation amount is greater than the association threshold. If the count is greater than a count threshold, the first pollutant discharge device is identified as the target pollutant discharge device.

The count threshold refers to a threshold for determining whether the count of the first associated pipelines corresponding to the pollutant discharge device is too large. In some embodiments, the count threshold is set by a skilled technician or by system default.

In some embodiments of the present disclosure, after the target pollutant discharge device is determined based on operations 310 to 330, by obtaining the first associated pipeline of the pollutant discharge pipeline corresponding to each of the at least one first pollutant discharge device and determining the target pollutant discharge device based on the current accumulation amount set, the first associated pipeline, and an association threshold, enhanced determination accuracy can be achieved on the basis of operations 310 to 330. Since gas input to downstream pipelines may carry residual impurities, additional consideration of downstream first associated pipelines helps mitigate failure risks caused by impurity accumulation in the downstream pipelines, thereby improving an accuracy for the determination of the target pollutant discharge device and an overall pollutant discharge efficiency.

FIG. 4 is a flowchart of another exemplary process for determining a target pollutant discharge device according to some embodiments of the present disclosure. As shown in FIG. 4, process 400 includes the following operations. In some embodiments, process 400 is performed by the smart gas company management platform 140.

In some embodiments, the smart gas company management platform 140 constructs a predictive feature map based on pollutant discharge working data and gas monitoring data, determines a future accumulation amount sequence based on the predictive feature map using a future prediction model, the future prediction model being a machine learning model, and determines the target pollutant discharge device based on the future accumulation amount sequence and a future threshold. The predictive feature map includes nodes and edges, the nodes include a pollutant discharge pipeline node and an ordinary pipeline node, attributes of the pollutant discharge pipeline node include a filtration device type, the pollutant discharge working data, future pollutant discharge data, a current accumulation amount set, a historical accumulation amount set, future maintenance data, the gas monitoring data, weather data, a pipeline physical characteristic, and a pipeline aging degree. Attributes of the ordinary pipeline node include the gas monitoring data, the weather data, the future maintenance data, the pipeline physical characteristic, and the pipeline aging degree. The edges include lines between physically connected nodes, attributes of the edges include a gas flow direction. The pollutant discharge working data includes current pollutant discharge data and historical pollutant discharge data, the gas monitoring data includes current monitoring data and historical monitoring data, and the weather data includes future weather data, current weather data, and historical weather data.

In 410, constructing a predictive feature map based on pollutant discharge working data and gas monitoring data.

The definition and structure of the predictive feature map are similar to that of the accumulation feature map described in FIG. 4. More descriptions may be found in the related descriptions thereof.

In some embodiments, the nodes of the predictive feature map include a pollutant discharge pipeline node and an ordinary pipeline node.

Definitions regarding the pollutant discharge pipeline node may be found elsewhere in the present disclosure (e.g., FIG. 3 and related descriptions thereof). In some embodiments, attributes of the pollutant discharge pipeline node include a filtration device type, pollutant discharge working data, future pollutant discharge data, a current accumulation amount set, a historical accumulation amount set, future maintenance data, the gas monitoring data, weather data, a pipeline physical characteristic, and a pipeline aging degree.

More descriptions regarding the filtration device type, the pollutant discharge working data, the current accumulation amount set, the gas monitoring data, and the pipeline physical characteristic may be found elsewhere in the present disclosure (e.g., FIG. 3 and related descriptions thereof)

The future pollutant discharge data refers to data of the pollutant discharge device working in a preset future time period.

In some embodiments, the future pollutant discharge data is obtained through backend retrieval, manual input, or the like.

In some embodiments, the future pollutant discharge data may be set by a skilled technician or by system default.

The historical accumulation amount sequence refers to a sequence consisting of pipelines corresponding to nodes at different historical time points in a preset historical time period and impurity accumulation amounts corresponding to the pipelines. For example, the historical accumulation amount sequence may be represented as: $\{[(C_1, D_{11}), (C_2, D_{12}) \ldots (C_i, D_{1i}) \ldots (C_n, D_{1n})], [(C_1, D_{21}), (C_2, D_{22}) \ldots (C_i, D_{2i}) \ldots (C_n, D_{2n})] \ldots [(C_1, D_{j1}), (C_2, D_{j2}) \ldots (C_i, D_{ji}) \ldots (C_n, D_{jn})] \ldots [(C_1, D_{m1}), (C_2, D_{m2}) \ldots (C_i, D_{mi}) \ldots (C_n, D_{mn})]\}$, $[(C_1, D_{j1}), (C_2, D_{j2}) \ldots (C_i, D_{ji}) \ldots (C_n, D_{jn})]$ denotes pipelines corresponding to nodes at a j-th historical time point and impurity accumulation amounts corresponding to the pipelines. $C_i$ represents a pipeline corresponding to an i-th node, $D_{ji}$ represents an impurity accumulation amount corresponding to the pipeline $C_i$ at the j-th historical time point. A count of the nodes is n and a count of the historical time points is m.

In some embodiments, the smart gas company management platform 140 obtains the historical accumulation amount sequence based on based on historical data, including the pipelines corresponding to the nodes and different historical time points within a preset historical time period and the impurity accumulation amounts corresponding to the pipelines.

The future maintenance data refers to data related to the maintenance of the pipelines corresponding to the nodes. For example, the future maintenance data includes a regular future maintenance plan (e.g., a regular repair, a replacement of a pipeline component, and a replacement time), or the like.

In some embodiments, the future maintenance data of a pipeline is set by a specialized technician based on a current condition of the pipeline.

The definition of the weather data is similar to the definition of the weather data in FIG. 3. The difference is that the weather data here may also include a temperature and a humidity of the future weather.

In some embodiments, the smart gas company management platform 140 obtains the weather data based on a weather API (e.g., an Open Weather Map, etc.).

The pipeline aging degree refers to a letter, a value, etc., used to characterize an aging condition of the pipeline corresponding to a node.

In some embodiments, the pipeline aging degree may affect a rate of impurity accumulation in the pipeline. For example, the higher the pipeline aging degree is, the more likely impurities accumulate in the pipeline.

In some embodiments, the smart gas company management platform 140 determines the pipeline aging degree through a sixth predetermined rule based on a pipeline service time. The sixth predetermined rule includes that the pipeline aging degree is positively correlated to the pipeline service time.

In some embodiments, the smart gas company management platform 140 determines the pipeline aging degree based on a historical impurity accumulation amount, the pipeline physical characteristic, the historical weather data, and historical gas composition data.

The historical gas composition data refers to a composition of gas in the pipeline during a preset historical time period.

In some embodiments, the smart gas company management platform 140 obtains the historical gas composition data based on historical data.

In some embodiments, the smart gas company management platform 140 constructs a first feature vector based on the historical impurity accumulation amount, the pipeline physical characteristic, the historical weather data, and the historical gas composition data of the gas pipeline, and then searches in a first vector database based on the first feature vector to determine the pipeline aging degree.

The first vector database refers to a database for determining the pipeline aging degree. In some embodiments, the first vector database includes a plurality of first reference vectors, and a reference pipeline aging degree corresponding to each of the first reference vectors.

In some embodiments, the smart gas company management platform 140 constructs the first reference vector based on the historical impurity accumulation amount, the historical pipeline physical characteristic, the historical weather data, and the historical gas composition data corresponding to first reference data, and takes the historical actual pipeline aging degree corresponding to the first reference data as the reference pipeline aging degree. The first reference data refers to historical data used to construct the first vector database.

In some embodiments, the reference pipeline aging degree is set by a skilled technician or by system default.

In some embodiments of the present disclosure, the smart gas company management platform 140 obtains a similarity between each of the first reference vectors and the first feature vector, respectively, and determines the pipeline aging degree corresponding to the first feature vector. For example, the first reference vector with a largest similarity is determined as a target vector, and the reference pipeline aging degree corresponding to the target vector is determined as the pipeline aging degree corresponding to the first feature vector. The similarity between the first reference vector and the first feature vector is negatively correlated to a vector distance between the first reference vector and the first feature vector, and the vector distance is determined based on a cosine distance, or the like. For example, the similarity is an inverse of the vector distance.

In some embodiments of the present disclosure, the smart gas company management platform 140 evaluates the actual pipeline aging degree of a gas pipeline more accurately through the first vector database, based on the historical impurity accumulation amount, the pipeline physical characteristic, the historical weather data, and the historical gas composition data of the gas pipeline.

Definition regarding the ordinary pipeline node may be found elsewhere in the present disclosure (e.g., FIG. 3 and related descriptions thereof). In some embodiments, the attributes of the ordinary pipeline node include the future maintenance data, the gas monitoring data, the weather data, the pipeline physical characteristic, the pipeline aging degree, or the like.

In some embodiments, the predictive feature map and the edges and the attributes of the predictive feature map are constructed in a manner similar to the accumulation feature map. More descriptions may be found in FIG. 3 and the related descriptions thereof.

In 420, determining a future accumulation amount sequence based on the predictive feature map using a future prediction model.

The future accumulation amount sequence refers to a sequence consisting of pipelines corresponding to nodes at a plurality of future time points and the impurity accumulation amounts corresponding to the pipelines. A format of the future accumulation amount sequence is similar to the format of the historical accumulation amount sequence, and is not repeated here.

In some embodiments of the present disclosure, the smart gas company management platform 140 determines the future accumulation amount sequence based on the predictive feature map using the future prediction model.

The future prediction model refers to a model for determining the future accumulation amount sequence. In some embodiments, the future prediction model is a machine learning model. For example, the future prediction model is a Graph Neural Network (GNN) model.

An input of the future prediction model includes the predictive feature map, and an output of the future prediction model includes the future accumulation amount sequence.

In some embodiments, the future prediction model is obtained through training based on a sample training set. The sample training set includes a plurality of sample predictive feature maps and a label corresponding to each of the plurality of sample predictive feature maps. The sample predictive feature map is constructed based on a sample filtration device type, sample pollutant discharge working data, sample gas monitoring data, sample weather data, a sample pipeline physical characteristic, a sample pipeline aging degree, sample future maintenance data, a sample current accumulation amount set, a sample historical accumulation amount set, and sample future pollutant discharge data. The label is a sample future accumulation amount sequence, wherein collection time points of the sample future accumulation amount sequence are after collection time points of the sample current accumulation amount set. The collection time points refer to time points at which impurity accumulation amounts are obtained.

In some embodiments, the future prediction model is trained in a similar manner as the accumulation amount determination model. More descriptions may be found in FIG. 3 and the related descriptions thereof.

In some embodiments, the sample training set is the plurality of sample predictive feature maps and the label corresponding to each of the plurality of sample predictive feature maps. The smart gas company management platform 140 constructs the historical sample predictive feature map based on historical pollutant discharge working data and historical gas monitoring data from a first historical moment and before the first historical moment in the sample training set. The label of the sample training set is the future accumulation amount sequence actually collected at a plurality of second historical moments corresponding to the sample training set. The first historical moment precedes the second historical moment. That is to say, the collection time points of the sample future accumulation amount sequence correspond to the plurality of second historical moments, the collection time points of the sample current accumulation amount set corresponds to the first historical moments, and the collection time points of the sample future accumulation amount sequence occur after the collection time points of the sample current accumulation amount set.

In some embodiments, among a plurality of sample predictive feature maps and labels corresponding to the sample predictive feature maps, a sample collection accuracy of the pollutant discharge pipeline corresponding to each of the pollutant discharge pipeline nodes in the sample predictive feature maps is higher than a sample collection accuracy of the pipeline corresponding to each of the ordinary nodes in the sample predictive feature maps. Furthermore, the sample collection accuracy of the pipeline corresponding to a node is related to the pipeline importance score corresponding to the node.

In some embodiments, the labels of the nodes have a same time interval. For example, for each of the pollutant discharge pipeline nodes, if sampling is performed hourly in a future period, the label of the pollutant discharge pipeline node is the pollutant discharge pipeline corresponding to the pollutant discharge pipeline node and an actual hourly impurity accumulation amount corresponding to the pollutant discharge pipeline. As another example, for each of the ordinary pipeline nodes, if sampling is performed every two hours in the future period, the label of the ordinary pipeline node is the ordinary pipeline corresponding to the ordinary pipeline node and an actual hourly impurity accumulation amount corresponding to the ordinary pipeline collected at each of the hours, and the corresponding impurity accumulation amount between the two hours is an average of the actual hourly impurity accumulation amounts corresponding to the two hours. Merely by way of example, for an ordinary pipeline node, if sampling is performed at 10:00 and 12:00 in the future period, the label of the ordinary pipeline node is the ordinary pipeline corresponds to the ordinary pipeline node and the impurity accumulation amounts corresponds to the ordinary pipeline at 10:00, 11:00, and 12:00. The impurity accumulation amount at 11:00 is an average of the impurity accumulation amounts at 10:00 and 12:00.

The collection accuracy refers to a degree of data accuracy during data collection.

In some embodiments, a higher collection accuracy means more sampling time points within a same time period for the sample future accumulation amount sequence—that is to say, a shorter time intervals between sampling time points. For example, for a node with a high pipeline importance score (e.g., a critical pollutant discharge pipeline node), the time interval for the label of the node may be once per hour. For the ordinary pipeline nodes, the time interval may be once every two hours or once every three hours, with no restrictions imposed here. As another example, if the collection accuracy of node 1 is higher than the collection accuracy of node 2, future time points corresponding to the label of node 1 may be 10:00, 11:00, 12:00, etc., while future time points corresponding to the label of node 2 may be 10:00, 12:00, etc., with no restrictions imposed here.

In some embodiments of the present disclosure, in the sample training set, the collection accuracy of a critical node is ensured to be higher than the collection accuracy of the ordinary node to improve a prediction accuracy of the future prediction model on the critical node. Specifically, the time intervals between the collection time points for the sample future accumulation amount sequence of the critical node are shorter, and the collected data is more abundant, enabling the future prediction model to more accurately capture the trend of impurity accumulation. This approach not only enhances the robustness of the future prediction model but also ensures more precise predictions for the critical node, thereby more effectively guiding future maintenance and cleaning operations. Furthermore, the differentiated resource allocation approach allows for more efficient utilization of limited monitoring resources and optimizes the monitoring strategy.

In 430, determining the target pollutant discharge device based on the future accumulation amount sequence and a future threshold.

The future threshold refers to a threshold used to determine whether an average increase in the impurity accumulation amount at a future time is too large.

In some embodiments, the smart gas company management platform 140 determines the future threshold through a seventh predetermined rule based on flow data of the pipeline and the pipeline importance score. The seventh predetermined rule includes that the future threshold is negatively correlated with the flow data of the pipeline and the pipeline importance score.

More descriptions regarding the flow data of the pipeline may be found elsewhere in the present disclosure (e.g., FIG. 2 and related descriptions thereof)

In some embodiments, in response to determining that the average increase in the impurity accumulation amount corresponding to a pollutant discharge device at the future time is greater than the future threshold, the smart gas company management platform 140 identifies the pollutant discharge device as the target pollutant discharge device. The increase in the impurity accumulation amount at the future time refers to a rate of change in the impurity accumulation amount corresponding to the future time with respect to an initial value or a previous time point.

In some embodiments, the smart gas company management platform 140 identifies future a time point when the impurity accumulation amount of a pollutant discharge device exceeds a cleaning threshold. If a time interval between the time point and a current time is less than a time threshold, the pollutant discharge device is designated as a target drainage device.

More descriptions regarding the cleaning threshold may be found elsewhere in the present disclosure (e.g., the operation of FIG. 3 and related descriptions thereof)

In some embodiments, the smart gas company management platform 140 determines the cleaning threshold through an eighth predetermined rule based on the pipeline importance score and the flow rate data of the pipeline. The eighth predetermined rule includes that the time threshold is negative correlated with the pipeline importance score and the flow data of the pipeline.

In some embodiments of the present disclosure, constructing the predictive feature map based on the pollutant discharge working data and the gas monitoring data can help to subsequently predict the future accumulation amount sequence more accurately. By applying the future prediction model to the predictive feature map, the prediction of the future accumulation amount sequence can better reflect complex data relationships, thereby enhancing prediction accuracy and reliability. Based on the future accumulation amount sequence and the future threshold to determine the target pollutant discharge device, the IoT system can more precisely identify the target drainage device, thereby optimizing cleaning prioritization, improving efficiency, and reducing resource waste.

It should be noted that the foregoing descriptions of process 400 are intended to be exemplary and illustrative only and do not limit the scope of application of the present disclosure. For a person skilled in the art, various corrections and changes may be made to the process 400 under the guidance of the present disclosure. However, these corrections and changes remain within the scope of the present disclosure.

In some embodiments, after determining the target pollutant discharge device based on operations 410 to 430, the pollutant discharge device not determined as the target pollutant discharge device is determined as a second pollutant discharge device. In response to determining that at least one second pollutant discharge device is identified, for a second pollutant discharge device of the at least one second pollutant discharge device, the smart gas company management platform 140 obtains, based on the gas monitoring data, a second associated pipeline of the pollutant discharge pipeline corresponding to the second pollutant discharge device, and determines the target pollutant discharge device based on the future accumulation amount sequence, the second associated pipeline, and an association threshold.

The second pollutant discharge device, the second associated pipeline, and the manner for obtaining the second associated pipeline is similar to the first pollutant discharge device, the first associated pipeline, and the manner for obtaining the first associated pipeline. More descriptions may be found in FIG. 3 and the related descriptions thereof.

In some embodiments, for a second pollutant discharge device of the at least one second pollutant discharge device, the smart gas company management platform 140 determines a count of its second associated pipelines in which the increase in the impurity accumulation amount is greater than the association threshold. If the count is greater than a count threshold, the second pollutant discharge device is determined as the target pollutant discharge device.

In some embodiments, in a preset future time period, for a second pollutant discharge device of the at least one second pollutant discharge device, the smart gas company management platform 140 determines a count of its second associated pipelines in which the impurity accumulation amount is greater than the association threshold. If the count is greater than the count threshold, the second pollutant discharge device is determined as the target pollutant discharge device.

In some embodiments of the present disclosure, by obtaining the second associated pipeline corresponding to the pollutant discharge pipeline of the second pollutant discharge device, an impact of the second associated pipeline on the second pollutant discharge device can be assessed, providing additional dimensional information for determining the target pollutant discharge device. Additionally, by integrating the future accumulation amount sequence, the second associated pipeline, and the associated threshold, the target pollutant discharge device can be determined more accurately. This approach not only considers the conditions of the second pollutant discharge device but also takes into account an influence of its associated pipelines, thereby improving the efficiency of cleaning operations. Furthermore, since gas input into downstream pipelines may carry impurities, further consideration of downstream second associated pipelines helps reduce the risk of failures caused by impurity accumulation in downstream pipelines, thereby enhancing the accuracy for the determination of the target pollutant discharge device determination.

FIG. 5 is a flowchart of an exemplary process for determining a cleaning working parameter according to some embodiments of the present disclosure. As shown in FIG. 5, process 500 includes the following operations. In some embodiments, process 500 may be performed by the smart gas company management platform 140.

In some embodiments, in response to determining that a target pollutant discharge device is identified, the smart gas company management platform 140 determines a pipeline cleaning parameter based on pollutant discharge working data and gas monitoring data. The smart gas company management platform 140 is configured to: obtain at least one candidate working parameter; for a candidate working parameter of the at least one candidate working parameter, determine a cleaning effect score and a cleaning time corresponding to the candidate working parameter based on the candidate working parameter, a current accumulation amount set of the target pollutant discharge device, an accumulated impurity composition, and a pipeline physical characteristic; and determine a cleaning working parameter based on the cleaning effect score and the cleaning time of the at least one candidate working parameter.

In 510, obtaining at least one candidate working parameter.

A candidate working parameter refers to a parameter that may be used for pipeline cleaning. The content of the candidate working parameter is similar to the content of the cleaning working parameter. For example, the candidate working parameter includes a pollutant discharge valve opening level, a monitoring level, and a smart working parameter of a cleaning crawling robot.

In some embodiments, the candidate working parameter is set based on experience. In some embodiments, the candidate working parameter is randomly generated by the smart gas company management platform 140. For example, each of the pollutant discharge valve opening level, the monitoring level, and the cleaning crawling robot of the smart working parameter is randomly generated within a working range. The working range may be predetermined, e.g., the working range is a safe working range, and the safe working range is determined based on a factory parameter.

In 520, for a candidate working parameter of the at least one candidate working parameter, determining a cleaning effect score and a cleaning time corresponding to the candidate working parameter based on the candidate working parameter, a current accumulation amount set of the target pollutant discharge device, an accumulated impurity composition, and a pipeline physical characteristic.

The accumulated impurity composition refers to components of accumulated impurities in the pollutant discharge pipeline. For example, the accumulated impurity composition may include sand, rust, water, vapor, sulfides, carbon dioxide, grease, microdust, or the like. In some embodiments, the accumulated impurity composition is obtained based on the gas composition data of gas before and after filtration. For example, an impurity component showing decreased concentration after filtration is identified as a component in the accumulated impurity composition.

The cleaning effect score refers to a score of a cleaning effect of cleaning the pollutant discharge pipeline based on the candidate working parameter. For example, the cleaning effect score may be set to a value between 0-1, 0 indicates that there is no cleaning, 1 indicates that the cleaning is thorough. The higher the value is, the better the cleaning effect is.

The cleaning time refers to a duration required to clean the pollutant discharge pipeline based on the candidate working parameter. For example, cleaning with a candidate working parameter takes 1 hour to complete.

In some embodiments, the smart gas company management platform 140 constructs a second feature vector based on the candidate working parameter, the current accumulation amount set of the target pollutant discharge device, the accumulated impurity composition, and the pipeline physical characteristic. Based on the second feature vector, the smart gas company management platform 140 searches in a second vector database to determine the cleaning effect score and the cleaning time corresponding to the candidate working parameter.

The second vector database refers to a database for determining the cleaning effect score and the cleaning time. In some embodiments, the second vector database includes a plurality of second reference vectors, and a reference cleaning effect score and a reference cleaning time corresponding to each of the second reference vectors.

In some embodiments, the smart gas company management platform 140 constructs the second reference vector based on second reference data corresponding to a historical impurity accumulation amount, a historical pipeline physical characteristic, historical weather data, and historical gas composition data, and designates a historical cleaning effect score and a historical cleaning time corresponding to the second reference data as the reference cleaning effect score and the reference cleaning time. The second reference data refers to historical data used to construct the second vector database.

In some embodiments, the reference cleaning time refers to an actual cleaning time corresponding to the second reference data.

In some embodiments of the present disclosure, the smart gas company management platform 140 determines the reference cleaning effect score based on a difference between filtration scores before and after cleaning, a difference between flow data before and after cleaning, and a difference between filtration ratios before and after cleaning in the second reference data. The difference between the filtration scores before and after cleaning, the difference between the flow data before and after cleaning, and the difference between the filtration ratios before and after cleaning are directly proportional to the reference cleaning effect score. More descriptions regarding the filtration score and the flow data may be found elsewhere in the present disclosure (e.g., FIG. 2 and related descriptions thereof)

The filtration ratio is equal to flow velocity data after filtering divided by flow velocity data before filtering. The flow velocity data before filtration refers to flow velocity data on a front side (e.g., a side entering the pollutant discharge device) of the pollutant discharge device, and the flow velocity data after filtration refers to flow velocity data on a back side (a side where impurities are discharged from the pollutant discharge device) of the pollutant discharge device.

In some embodiments, the smart gas company management platform 140 ensures that a data amount within the second vector database is sufficient by continuously updating the data within the second vector database. For example, data recorded during each cleaning operation forms a second reference vector, and a reference cleaning effect score of the cleaning operation is determined, so that the above-determined second reference vector and the corresponding reference cleaning effect score and reference cleaning time are stored in the second vector database.

The process of searching the second vector database is similar to the process of searching the first vector database, and will not be repeated here.

In 530, determining the cleaning working parameter based on the cleaning effect score and the cleaning time of the at least one candidate working parameter.

In some embodiments, the smart gas company management platform 140 determines, from the at least one candidate working parameter, candidate working parameter with a highest overall score as the cleaning working parameter.

In some embodiments, the smart gas company management platform 140 determines the overall score using Equation (3):

$$q = h \times y + s \times t. \qquad (3)$$

In Equation (3), q denotes the overall score, y denotes the cleaning effect score, t denotes the cleaning time, h and s are the coefficients of y and t, respectively, wherein h is a positive number and s is a negative number.

In some embodiments, the smart gas company management platform 140 determines the cleaning working parameter based on the cleaning effect score, the cleaning time, and the pipeline importance score of the target pollutant discharge device. For example, the coefficient h of the cleaning effect score y in Equation (3) correlates to the pipeline importance score of the target pollutant discharge device. The pipeline importance score of the target pollutant discharge device is directly proportional to the coefficient h.

In some embodiments of the present disclosure, considering the pipeline importance score when determining the cleaning operational parameter allows more resources to be allocated to pipelines with relatively high importance scores, thereby ensuring the effectiveness of the cleaning operation. By assigning a higher weight to the cleaning effect score for more critical pipelines, an optimal cleaning result can be ensured for the pipelines and impurity residues can be reduced, thereby extending the service life of the pipelines and minimizing failure risks.

In some embodiments of the present disclosure, determining the cleaning working parameter based on the cleaning effect score and the cleaning time allows for the efficient selection of an appropriate cleaning working parameter. This approach achieves the cleaning objective while reducing operation time and improving cleaning efficiency.

It should be noted that the foregoing descriptions of process 500 are intended to be exemplary and illustrative only and do not limit the scope of application of the present disclosure. For a person skilled in the art, various corrections and changes may be made to process 500 under the guidance of the present disclosure. However, these corrections and changes remain within the scope of the present disclosure.

In some embodiments, in response to determining that the accumulated impurity composition satisfies an additional cleaning condition, the smart gas company management platform generates an additional cleaning instruction based on the accumulated impurity composition, and sends the additional cleaning instruction to the smart gas device object platform to control the cleaning crawling robot to carry an additional cleaning component to clean the target pollutant discharge device.

The additional cleaning condition refers to a condition for determining whether or not a cleaning manner other than a basic cleaning manner (e.g., ejecting a water stream) is required for cleaning. In some embodiments, the additional cleaning condition includes a content of a critical impurity component in the accumulated impurity composition being greater than a corresponding condition threshold. The critical impurity component refers to a type of impurities that may not be removed by the basic cleaning manner. Different critical impurity components correspond to different condition thresholds, and the condition thresholds may be predefined. For example, the additional cleaning condition includes a content of a corrosive substance in the accumulated impurity composition exceeding m %, a content of a chemical deposit in the accumulated impurity composition exceeding n %, a content of a microorganism in the accumulated impurity composition exceeding v %, or the like.

It may be understood that different critical impurity components correspond to different cleaning manners. For example, the additional cleaning condition includes that if the content of the corrosive substance in the accumulated impurity composition exceeds m %, or the content of the chemical deposit in the accumulated impurity composition exceeds n %, using the basic cleaning manner is ineffective in removing the corrosive substance and the chemical deposit, thus a chemical cleaning agent or a solvent may be used to assist in cleaning. As another example, if the content of the microorganism in the accumulated impurity composition exceeds v %, a biocidal agent (e.g., a side-effect-free bactericide or a disinfectant) that does not damage the pipeline may be used for cleaning.

The additional cleaning instruction refers to an instruction to control the cleaning crawling robot to carry the additional cleaning component to clean the target pollutant discharge device. The additional cleaning component refers to a component other than cleaning components used in the basic cleaning manner. For example, the additional cleaning instruction includes an instruction for the cleaning crawling robot to load a bactericide sprayer, spray a disinfectant evenly on an inner wall of the pipeline, and allow the disinfectant to remain on the pipeline for a period of time.

In some embodiments, the smart gas company management platform 140 generates the additional cleaning instruction through a ninth predetermined rule based on the accumulated impurity composition. The ninth predetermined rule specifies additional cleaning instructions corresponding to different additional cleaning conditions, and the additional cleaning instructions may be preset by a technician. For example, the ninth predetermined rule includes that if the content of the microorganism in the accumulated impurity composition exceeds v %, the additional cleaning instruction is to instruct the cleaning crawling robot to load a bactericide sprayer, spray a disinfectant evenly on the inner wall of the pipeline, and allow the disinfectant to remain on the pipeline for a period of time.

In some embodiments of the present disclosure, for the hard-to-clean accumulated impurities (e.g., the critical impurity components), the cleaning crawling robot is controlled via the additional cleaning instruction to perform extra cleaning operations on the hard-to-clean accumulated impurities, so that the pollutant discharge pipeline can be cleaned more comprehensively to improve the cleaning effect.

In some embodiments, the cleaning crawling robot includes an ultrasonic sensor. Before cleaning, ultrasonic data is collected by the cleaning crawling robot based on the ultrasonic sensor, and the ultrasonic data is uploaded to the smart gas company management platform 140 via the smart gas device object platform. The smart gas company management platform 140 determines actual pipeline information and an actual working parameter of the cleaning crawling robot based on the ultrasonic data.

The ultrasonic sensor refers a sensor that converts an ultrasonic signal into an energy signal (e.g., an electrical signal). An ultrasonic wave exhibits an excellent penetration effect on a liquid and a solid. When encountering an impurity or an interface, the ultrasonic wave generates a significant reflection, forming a reflected echo. Therefore, the ultrasonic wave may be used to measure an actual thickness of the pipeline and a thickness of the accumulated impurities.

The ultrasonic data refers to data collected using the ultrasonic sensor.

The actual pipeline information refers to actual information of the pipeline and the accumulated impurities. For example, the actual pipeline information may include the actual thickness of the pipeline, the thickness of the accumulated impurities, or the like.

In some embodiments, the smart gas company management platform 140 obtains the actual pipeline information based on the ultrasonic data. In some embodiments, the ultrasonic data may be processed using a plurality of manners to obtain the actual pipeline information. For example, the manners may include algorithms such as a Pulse-Echo Method (PEM), a Through-Transmission Method (TTM), or the like.

The actual working parameter refers to a parameter used by the cleaning crawling robot during actual cleaning operations.

In some embodiments, the smart gas company management platform 140 determines the actual working parameter through a tenth predetermined rule based on the actual pipeline information.

The tenth predetermined rule refers to a rule that associates different actual pipeline information with corresponding actual working parameters. The actual working parameters may be set by the technician. For example, the tenth predetermined rule includes that if a thickness of a pipeline at a location in the pipeline is below a thickness threshold and/or a thickness of the accumulated impurities at the location is below an accumulation amount threshold, to avoid further damage to a wall of the pipeline, the cleaning crawling robot uses a brush and a water stream to perform cleaning, and a cleaning intensity of the brush and a cleaning intensity of the water stream is positively correlated to the thickness of the accumulated impurities at the location. As another example, the tenth predetermined rule includes that if the thickness of the pipeline at a location in the pipeline is greater than the thickness threshold and the thickness of the accumulated impurities at the location is greater than the accumulation amount threshold, the cleaning crawling robot performs cleaning with a scraper and the water stream, and a cleaning intensity of the brush and the cleaning intensity of the water stream is positively correlated to the thickness of the impurity accumulation amount at the location. The thickness threshold and the accumulation amount threshold may be predetermined by a technician.

In some embodiments of the present disclosure, utilizing the ultrasonic sensor, the actual thickness of the pipeline and the thickness of the accumulated impurities can be determined, allowing for a more accurate actual working parameter to be determined, thereby ensuring effective cleaning while protecting the wall of the pipeline and preventing further damages.

One or more embodiments of the present disclosure provide a non-transitory computer-readable storage medium storing computer instructions. When reading the computer instructions in the storage medium, a computer implements the method for pipeline cleaning based on smart gas supervision IoT described in one or more embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be noted that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for pipeline cleaning based on smart gas supervision Internet of Things (IoT), executed by an Internet of Things (IoT) system for smart gas supervision, wherein the IoT system comprises a smart gas government safety monitoring management platform, a smart gas government safety supervision sensor network platform, a smart gas government safety supervision object platform, a smart gas company sensor network platform, and a smart gas device object platform;

the smart gas government safety supervision object platform includes a smart gas company management platform;

the smart gas company management platform includes a gas database, the gas database being configured as a storage device;

the smart gas government safety monitoring management platform and the smart gas company management platform are configured as servers;

the smart gas government safety supervision sensor network platform and the smart gas company sensor network platform are configured as communication networks;

the smart gas device object platform is configured as a pollutant discharge device and a gas monitoring device, the pollutant discharge device including at least one of a filtration device and a pollutant discharge pipeline, the gas monitoring device being provided on a gas pipeline;

the method comprises:

the smart gas company management platform obtaining, through the smart gas company sensor network platform, pollutant discharge working data and gas monitoring data obtained by the smart gas device object platform, and storing the pollutant discharge working data and the gas monitoring data in the gas database;

the smart gas company management platform;

constructing an accumulation feature map based on the pollutant discharge working data and the gas monitoring data determining a current accumulation amount set using an accumulation amount determination model based on the accumulation feature map, the accumulation amount determination model being a machine learning model;

determining a target pollutant discharge device based on the current accumulation amount set and a cleaning threshold;

uploading the target pollutant discharge device and a cleaning working parameter corresponding to the target pollutant discharge device to the smart gas government safety monitoring management platform, the cleaning working parameter including a pollutant discharge valve opening level, a monitoring level of the target pollutant discharge device, and a smart working parameter of a cleaning crawling robot; and the smart gas government safety monitoring management platform generating a cleaning regulation instruction based on the target pollutant discharge device and the pipeline cleaning parameter corresponding to the target pollutant discharge device, and sending the cleaning regulation instruction to the smart gas device object platform to control the target pollutant discharge device to perform cleaning based on the cleaning working parameter.

2. The method of claim 1, wherein the cleaning regulation instruction includes an indirect regulation instruction, the indirect regulation instruction is configured to increase a monitoring level of the gas monitoring device on an affected pipeline when the target pollutant discharge device is being cleaned, the affected pipeline refers to a pipeline associated with the pollutant discharge pipeline corresponding to the target pollutant discharge device.

3. The method of claim 1, wherein the accumulation feature map includes nodes and edges, the nodes include a pollutant discharge pipeline node and an ordinary pipeline node, attributes of the pollutant discharge pipeline node include a filtration device type, the pollutant discharge working data, the gas monitoring data, weather data, and a pipeline physical characteristic, attributes of the ordinary pipeline node include the gas monitoring data, the weather data, and the pipeline physical characteristic, the edges include lines between physically connected nodes, and attributes of the edges include a gas flow direction, the pollutant discharge working data includes current pollutant discharge data and historical pollutant discharge data, the gas monitoring data includes current monitoring data and historical monitoring data, and the weather data includes current weather data and historical weather data.

4. The method of claim 3, wherein the current accumulation amount set includes at least one pollutant discharge pipeline corresponding to at least one pollutant discharge pipeline node and at least one current impurity accumulation amount of the at least one pollutant discharge pipeline, and the method further comprises:

for a pollutant discharge pipeline corresponding to a pollutant discharge pipeline node of the at least one pollutant discharge pipeline node and a current impurity accumulation amount of the pollutant discharge pipeline, in response to determining that the current impurity accumulation amount is less than the cleaning threshold and greater than a concern threshold, the smart gas company management platform identifying the pollutant discharge pipeline corresponding to the current impurity accumulation amount as a concerned pollutant discharge pipeline, generating a monitoring enhancement instruction, and sending the monitoring enhancement instruction to the smart gas device object platform to increase a monitoring level of the gas monitoring device for the concerned pollutant discharge pipeline.

5. The method of claim 3, wherein the cleaning threshold is determined based on the pipeline physical characteristic, the historical monitoring data, and a pipeline importance score.

6. The method of claim 3, wherein in response to determining that at least one first pollutant discharge device is identified, each of the at least one first pollutant discharge device being a pollutant discharge device not identified as the target pollutant discharge device, the method further comprises:

for a first pollutant discharge device of the at least one first pollutant discharge device, obtaining, based on the gas monitoring data, a first associated pipeline of the pollutant discharge pipeline corresponding to the first pollutant discharge device; and determining the target pollutant discharge device based on the current accumulation amount set, the first associated pipeline, and an association threshold.

7. The method of claim 1, wherein in response to determining that the target pollutant discharge device is identified, the method further comprises:

obtaining at least one candidate working parameter;

for a candidate working parameter of the at least one candidate working parameter, determining a cleaning effect score and a cleaning time corresponding to the candidate working parameter based on the candidate working parameter, the current accumulation amount set of the target pollutant discharge device, an accumulated impurity composition, and a pipeline physical characteristic; and determining the cleaning working parameter based on the cleaning effect score and the cleaning time of the at least one candidate working parameter.

8. An Internet of Things (IoT) system for smart gas supervision, comprising a smart gas government safety monitoring management platform, a smart gas government safety supervision sensor network platform, a smart gas government safety supervision object platform, a smart gas company sensor network platform, and a smart gas device object platform; wherein the smart gas government safety supervision object platform includes a smart gas company management platform;

the smart gas company management platform includes a gas database, the gas database being configured as a storage device;

the smart gas government safety monitoring management platform and the smart gas company management platform are configured as servers;

the smart gas government safety supervision sensor network platform and the smart gas company sensor network platform are configured as communication networks;

the smart gas device object platform is configured as a pollutant discharge device and a gas monitoring device, the pollutant discharge device including at least one of a filtration device and a pollutant discharge pipeline, the gas monitoring device being provided on a gas pipeline;

the smart gas company management platform is configured to obtain, through the smart gas company sensor network platform, pollutant discharge working data and gas monitoring data obtained by the smart gas device object platform, and store the pollutant discharge working data and the gas monitoring data in the gas database;

the smart gas company management platform is configured to:

construct an accumulation feature map based on the pollutant discharge working data and the gas monitoring data determine a current accumulation amount set using an accumulation amount determination model based on the accumulation feature map, the accumulation amount determination model being a machine learning model;

determine a target pollutant discharge device based on the current accumulation amount set and a cleaning threshold;

upload the target pollutant discharge device and a cleaning working parameter corresponding to the target pollutant discharge device to the smart gas government safety monitoring management platform, the cleaning working parameter including a pollutant discharge valve opening level, a monitoring level of the target pollutant discharge device, and a smart working parameter of a cleaning crawling robot; and the smart gas government safety monitoring management platform is configured to generate a cleaning regulation instruction based on the target pollutant discharge device and the pipeline cleaning parameter corresponding to the target pollutant discharge device, and send the cleaning regulation instruction to the smart gas device object platform to control the target pollutant discharge device to perform cleaning based on the cleaning working parameter.

9. A non-transitory computer-readable storage medium storing computer instructions, wherein when reading the computer instructions in the storage medium, a computer implements a method for pipeline cleaning based on smart gas supervision IoT, the method being executed by an IoT system for smart gas supervision, wherein the IoT system comprises a smart gas government safety monitoring management platform, a smart gas government safety supervision sensor network platform, a smart gas government safety supervision object platform, a smart gas company sensor network platform, and a smart gas device object platform;

the smart gas government safety supervision object platform includes a smart gas company management platform;

the smart gas company management platform includes a gas database, the gas database being configured as a storage device;

the smart gas government safety monitoring management platform and the smart gas company management platform are configured as servers;

the smart gas government safety supervision sensor network platform and the smart gas company sensor network platform are configured as communication networks;

the smart gas device object platform is configured as a pollutant discharge device and a gas monitoring device, the pollutant discharge device including at least one of a filtration device and a pollutant discharge pipeline, the gas monitoring device being provided on a gas pipeline;

the method comprises:

the smart gas company management platform obtaining, through the smart gas company sensor network plat-form, pollutant discharge working data and gas monitoring data obtained by the smart gas device object platform, and storing the pollutant discharge working data and the gas monitoring data in the gas database;

the smart gas company management platform;

constructing an accumulation feature map based on the pollutant discharge working data and the gas monitoring data determining a current accumulation amount set using an accumulation amount determination model based on the accumulation feature map, the accumulation amount determination model being a machine learning model;

determining a target pollutant discharge device based on the current accumulation amount set and a cleaning threshold;

uploading the target pollutant discharge device and a cleaning working parameter corresponding to the target pollutant discharge device to the smart gas government safety monitoring management platform, the cleaning working parameter including a pollutant discharge valve opening level, a monitoring level of target pollutant discharge device, and a smart working parameter of a cleaning crawling robot; and the smart gas government safety monitoring management platform generating a cleaning regulation instruction based on the target pollutant discharge device and the pipeline cleaning parameter corresponding to the target pollutant discharge device, and sending the cleaning regulation instruction to the smart gas device object platform to control the target pollutant discharge device to perform cleaning based on the cleaning working parameter.

\* \* \* \* \*